(12) United States Patent
Huang

(10) Patent No.: US 10,715,571 B2
(45) Date of Patent: Jul. 14, 2020

(54) SELF-ADAPTIVE STREAMING MEDIUM PROCESSING METHOD AND APPARATUS

(71) Applicant: ZTE Corporation, Shenzhen (CN)

(72) Inventor: Cheng Huang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 381 days.

(21) Appl. No.: 15/558,008

(22) PCT Filed: Dec. 7, 2015

(86) PCT No.: PCT/CN2015/096589
§ 371 (c)(1),
(2) Date: Jan. 5, 2018

(87) PCT Pub. No.: WO2016/145913
PCT Pub. Date: Sep. 22, 2016

(65) Prior Publication Data
US 2018/0159909 A1 Jun. 7, 2018

(30) Foreign Application Priority Data
Mar. 13, 2015 (CN) .......................... 2015 1 0113122

(51) Int. Cl.
*H04N 21/8547* (2011.01)
*H04L 29/06* (2006.01)
(Continued)

(52) U.S. Cl.
CPC ........... *H04L 65/60* (2013.01); *H04N 21/242* (2013.01); *H04N 21/4302* (2013.01);
(Continued)

(58) Field of Classification Search
CPC ........... H04N 21/8547; H04N 21/8456; H04N 21/845; H04N 21/4622; H04N 21/4307;
(Continued)

(56) References Cited

U.S. PATENT DOCUMENTS

| 7,953,707 B2 | 5/2011 | Hamel | |
| 2013/0125187 A1* | 5/2013 | Kim | H04N 21/23608 |
| | | | 725/109 |

(Continued)

FOREIGN PATENT DOCUMENTS

| CN | 101378356 A | 3/2009 |
| CN | 103036888 A | 4/2013 |

(Continued)

OTHER PUBLICATIONS

Christopher Kohnen, et al.: "A DVB/IP Streaming Testbed for Hybrid Digital Media Content Synchronization"; 2012 IEEE Second International Conference on Consumer Electronics—Berlin (ICCE-Berlin), 978-1-4673-1547-0; pp. 5.

(Continued)

*Primary Examiner* — Le H Luu
(74) *Attorney, Agent, or Firm* — Cantor Colburn LLP

(57) ABSTRACT

A media processing method and apparatus for adaptive streaming are provided. In the method, a Media Presentation (MP) timeline alignment event message carried in a media segment is acquired; an aligned media segment is determined according to the MP timeline alignment event message, where the aligned media segment is a media segment of which a Media Presentation Time (MPT) in an MP timeline is aligned to an external timeline; and one or more MPTs of one or more media segments in an MP timeline alignment event after a mapping between the MP timeline and the external timeline has been established are calculated.

18 Claims, 13 Drawing Sheets

(51) Int. Cl.
*H04N 21/845* (2011.01)
*H04N 21/43* (2011.01)
*H04N 21/462* (2011.01)
*H04N 21/242* (2011.01)

(52) U.S. Cl.
CPC ..... *H04N 21/4307* (2013.01); *H04N 21/4622* (2013.01); *H04N 21/845* (2013.01); *H04N 21/8456* (2013.01); *H04N 21/8547* (2013.01)

(58) Field of Classification Search
CPC ............. H04N 21/4302; H04N 21/242; H04N 21/23439; H04N 21/2343; H04N 21/23608; H04N 21/238; H04N 21/41407; H04N 21/47217; H04L 65/60; H04L 65/607; G06F 16/24578; G11B 27/034
See application file for complete search history.

(56) References Cited

U.S. PATENT DOCUMENTS

| | | | | |
|---|---|---|---|---|
| 2013/0246643 | A1* | 9/2013 | Luby | H04N 21/23439 709/231 |
| 2014/0019635 | A1* | 1/2014 | Reznik | H04L 65/607 709/231 |
| 2015/0019972 | A1* | 1/2015 | Matsuda | G11B 27/034 715/723 |
| 2015/0089074 | A1* | 3/2015 | Oyman | H04N 21/2343 709/231 |
| 2015/0172353 | A1* | 6/2015 | Hannuksela | H04N 21/47217 709/219 |
| 2015/0201253 | A1* | 7/2015 | Lim | H04N 21/4307 725/116 |
| 2015/0234833 | A1* | 8/2015 | Cremer | G06F 16/24578 707/626 |
| 2015/0261425 | A1* | 9/2015 | Marusich | H04N 21/41407 715/719 |
| 2017/0019688 | A1* | 1/2017 | Lee | H04N 21/238 |

FOREIGN PATENT DOCUMENTS

| | | |
|---|---|---|
| CN | 103947215 A | 7/2014 |
| CN | 103988479 A | 8/2014 |
| CN | 104185040 A | 12/2014 |
| CN | 104205859 A | 12/2014 |
| CN | 104255009 A | 12/2014 |
| WO | 2013140033 A1 | 9/2013 |

OTHER PUBLICATIONS

International Search Report for corresponding application PCT/CN2015/096589 filed on Dec. 7, 2015; dated Feb. 22, 2017.

Digital Video Broadcasting (DVB); MPEG-DASH Profile for Transport of ISO BMFF Based DVB Services over IP Based Networks; May 19, 2014, XP017844473.

European Search Report and Written Opinion for corresponding application 15 885 282.2; Report dated Nov. 30, 2017.

Proposed exploration of Uniform Signalling for Timeline Alignment, MPEG Meeting, Feb. 19, 2014, XP030020888.

European Examination Communication for corresponding application 15 885 282.2; Report dated Jul. 19, 2019.

* cited by examiner

SELF-ADAPTIVE STREAMING MEDIUM PROCESSING METHOD AND APPARATUS

TECHNICAL FIELD

The disclosure relates to the field of communications, and more particularly to a media processing method and apparatus for adaptive streaming.

BACKGROUND

A user may access a communication service developed and deployed by a service provider and/or content provider by means of a fixed mobile terminal such as a television set, a desktop computer, a tablet computer or a mobile phone. The access may be implemented by establishing a communication link between a user terminal and a service server (e.g., a content server) through a customized communication client capacity. The communication link may be established by a cable communication network such as an X Digital Subscriber Line (xDSL), a Fiber-to-the-x and a cable, and a radio communication network such as Wi-Fi, 2G, 3G and Long Term Evolution (LTE).

Digital Video Broadcasting (DVB) is one of the world's mainstream digital television standards. On the basis of an MPEG-2 audio/video data compression algorithm and a multiplexing technology, the DVB standard provides a set of complete specifications of a digital television system applicable to different media. The DVB standard also defines three channel coding and modulation schemes for media data stream transmission, namely DVB-C, DVB-S and DVB-T. In addition, the DVB standard expands a system layer of an MPEG-2 standard, and enriches network interfaces.

Dynamic Adaptive Streaming over Hyper Text Transport Protocol (HTTP) (DASH) is an adaptive bit rate streaming media technology. This technology may provide high-quality streaming media contents by utilizing a traditional HTTP Web server on the internet. The DASH technology may segment a video into multiple small file blocks on the HTTP server, each file block containing a video content lasting for a short time. These small video blocks may be parts of live broadcast video content of films (on-demand) or sport competitions lasting for multiple hours. The video may be compiled into video segments with a plurality of code rates, so as to cover different network bandwidth demands.

In a development process of the above communication service, a terminal capacity and a network environment are continuously improved, and user demands for service experience are improved. An OTT technology as represented by adaptive streaming media, is flexible for the requirement of consuming videos anytime and anywhere and traditional broadcasting technologies such as an IPTV, a digital television and a satellite television have high definition and quality guarantee of a large screen. Therefore, a comprehensive solution suitable for various scenarios may be provided by combining the OTT technology and the digital television broadcasting technology. Typically, for example, a second screen application has attracted great attention, and a user may consume personalized media information associated with a TV screen broadcast program by utilizing a smart phone, a tablet computer or other TV buddies. A service operator may transmit traditional television programs to the majority of users by utilizing a broadcast network (e.g., DVB-C digital television network), and meanwhile, internet on-demand content having a long-tail effect may be additionally delivered to a specific user group by means of an internet broadband network (OTT mode). This hybrid delivery mode may save the network investment cost, and combine the technical advantages of the broadcast network and the broadband network, thereby providing rich-content and personalized service experience for the user.

The above-mentioned hybrid delivery mode is significantly characterized by independent content source, transmission network heterogeneity, differentiated playing terminals and the like. Whether time association of a broadcast program or primary media with a broadband program or ancillary media may be established, i.e., whether synchronous playing among different content sources, different transmission formats and media contents of different playing terminals may be ensured, has become key to whether this class of applications may be accepted by a user.

Audio/video feature identification technology and application of the audio/video feature identification technology are a current direction of research for solving the problem of media content synchronization under the above-mentioned hybrid delivery mode. The audio/video feature identification technology may utilize digital features of audio/video media contents as an inter-media time synchronization reference. The audio/video feature identification technology may specifically include, but not limited to, the following technologies. (1) One technology is digital watermark technology, in which digital watermarks of an audio signal in a television program may be collected, and a time progress of a program that is currently played may be detected by utilizing program channel identifier and timestamp information in the digital watermarks, so as to acquire and synchronously play appropriate ancillary media synchronously. (2) Another technology is digital fingerprint technology, in which digital fingerprint information may be extracted from an audio/video sample, and a database may be retrieved by utilizing fingerprints to acquire media synchronization information.

However, the digital watermarks and the digital fingerprints correspond to a computer-intensive technical implementation, and depend on audio/video sample capture quality and feature extraction algorithm performances of a second-screen terminal. In addition, these technologies may be greatly influenced by environment noise and terminal capacity, and therefore application scenarios of the technologies may have a certain limitations.

Another research direction for solving a problem of media synchronization playing under a hybrid delivery mode is employing a single reference clock to deliver media composed of a broadcast network and a broadband network. In one of the methods, Program Clock Reference/Presentation Time Stamp (PCR/PTS) clock information carried in a Transport Stream (TS), for example, an MPEG-2 TS code stream, may be contained in, for example, an Internet Protocol (IP) message of a Real-time Transport Protocol (RTP) for transmission. A main defect of this solution is that the PCR clock information in the TS may be changed during demultiplexing (but, a broadband operator cannot learn of this information), so that the clock continuity cannot be maintained.

SUMMARY

According to one embodiment of the disclosure, a media processing method for adaptive streaming is provided. The method may include the following acts. A Media Presentation (MP) timeline alignment event message carried in a media segment may be acquired. An aligned media segment may be determined according to the MP timeline alignment event message, where the aligned media segment may be a media segment of which a Media Presentation Time (MPT) in an MP timeline is aligned to an external timeline. One or more MPTs of one or more media segments in an MP timeline alignment event after a mapping between the MP timeline and the external timeline has been established may be calculated.

The act of acquiring the MP timeline alignment event message carried in the media segment may include the following acts. An inband event stream (InbandEventStream) element in a Media Presentation Descriptor (MPD) may be accessed. The MP timeline alignment event message carried in the media segment corresponding to the InbandEventStream element may be acquired.

The InbandEventStream element may include: an event stream scheme identifier (schemeIdUri) attribute and an event stream value (value) attribute, configured to indicate the MP timeline alignment event.

The MP timeline alignment event message may include at least one of: a presentation time delta (presentation_time_delta) field, configured to provide time for the MP timeline alignment event; an event duration (event_duration) field, configured to represent an MP remaining duration; and a message data (message_data) field, configured to provide a presentation time $T_P$ of the aligned media segment relative to a period start time (PeriodStart time).

The MP timeline alignment event message may further include: a scheme message scheme identifier (scheme_id_uri) field and an event value (value) field. A value of the scheme_id_uri field may be equal to a value of an event stream scheme identifier (SchemeIdUri) attribute, and a value of the value field may be equal to a value of an event stream value (value) attribute.

The act of determining the aligned media segment according to the MP timeline alignment event message may include the following act. If a value of the presentation_time_delta field in the MP timeline alignment event message is set to a predetermined value, the media segment may be determined to be aligned to the external timeline.

The method may further include the following act. The MPT of the aligned media segment may be calculated based on the presentation time $T_P$ in the message_data field in the MP timeline alignment event message and a value of a presentation time offset $T_O$ attribute of a Representation where the aligned media segment is located. In an embodiment, the MPT of the aligned media segment may be $T_M = T_P - T_O$.

The act of calculating the one or more MPTs of the one or more media segments may include the following acts. One or more media segments, having a same id field value, in the MP timeline alignment event message may be determined as the one or more media segments in the MP timeline alignment event. The one or more MPTs of the one or more media segments in the MP timeline alignment event may be calculated according to a value of the presentation_time_delta field and a value of a timescale field within the MP timeline alignment event message.

The act of calculating the one or more MPTs of the one or more media segments in the MP timeline alignment event according to the value of the presentation_time_delta field in the MP timeline alignment event message and the value of the timescale field may include the following act. The one or more MPTs of the one or more media segments in the MP timeline alignment event may be calculated according to a following formula: MPT=MPT$_0$+emsg.presentation_time_delta/emsg.timescale. In this embodiment, MPT$_0$ and MPT may separately represent the MPT of the aligned media segment in the MP timeline alignment event and MPT of a subsequent media segment in the MP timeline alignment event; and emsg.presentation_time_delta and emsg.timescale may separately represent a value of the presentation_time_delta field and a timescale value within the MP timeline alignment event message.

Before the act of acquiring the MP timeline alignment event message carried in the media segment, the method may further include the following act. The media segment carrying the MP timeline alignment event message may be acquired.

The act of acquiring the media segment carrying the MP timeline alignment event message may include the following acts. A scheme message scheme identifier (scheme_id_uri) field and an event value (value) field may be acquired. An inband event stream (InbandEventStream) element in an MPD may be determined by using a value of the scheme_id_uri field and a value of the value field. A media segment corresponding to the InbandEventStream element may be acquired as the media segment.

The external timeline may include a TS timeline.

According to another embodiment of the disclosure, a media processing apparatus for adaptive streaming is provided. The apparatus may include: a first acquisition module, a determination module and a calculation module. The first acquisition module may be configured to acquire an MP timeline alignment event message carried in a media segment. The determination module may be configured to determine an aligned media segment according to the MP timeline alignment event message, where the aligned media segment may be a media segment of which an MPT in an MP timeline is aligned to an external timeline. The calculation module may be configured to calculate one or more MPTs of one or more media segments in an MP timeline alignment event after a mapping between the MP timeline and the external timeline has been established.

The first acquisition module may include: a first access unit and a first acquisition unit. The first access unit may be configured to access an inband event stream (InbandEventStream) element in an MPD. The first acquisition unit may be configured to acquire the MP timeline alignment event message carried in the media segment corresponding to the InbandEventStream element.

The InbandEventStream element may include: an event stream scheme identifier (schemeIdUri) attribute and an event stream value (value) attribute, configured to indicate the MP timeline alignment event.

The MP timeline alignment event message may include at least one of: a presentation time delta (presentation_time_delta) field, configured to provide time for the MP timeline alignment event; an event duration (event_duration) field, configured to represent an MP remaining duration; and a message data (message_data) field, configured to provide a presentation time $T_P$ of the aligned media segment relative to a period start time (PeriodStart time).

The MP timeline alignment event message may further include: a scheme message scheme identifier (scheme_id_uri) field and an event value (value) field. In an embodiment, a value of the scheme_id_uri field may be equal to a value of an event stream scheme identifier (SchemeIdUri) attribute, and a value of the value field may be equal to a value of an event stream value (value) attribute.

The determination module may include a first determination unit. The first determination unit may be configured to, if a value of the presentation_time_delta field in the MP timeline alignment event message is set to a predetermined value, determine the media segment to be aligned to the external timeline.

The apparatus may be further configured to calculate the MPT of the aligned media segment based on the presentation time $T_P$ in the message_data field in the MP timeline alignment event message and a value of a presentation time offset TO attribute of a Representation where the aligned media segment is located. In the embodiment, the MPT of the aligned media segment may be $T_M=T_P-T_O$.

The calculation module may include: a second determination unit and a calculation unit. The second determination unit may be configured to determine one or more media segments, having a same id field value, in the MP timeline alignment event message as the one or more media segments in the MP timeline alignment event. The calculation unit may be configured to calculate the one or more MPTs of the one or more media segments in the MP timeline alignment event according to a value of the presentation_time_delta field and a value of a timescale field within the MP timeline alignment event message.

The calculation unit may be configured to calculate the one or more MPTs of the one or more media segments in the MP timeline alignment event according to a following formula: MPT=$MPT_0$+emsg.presentation_time_delta/emsg.timescale. In the embodiment, $MPT_0$ and MPT may separately represent the MPT of the aligned media segment in the MP timeline alignment event and MPT of a subsequent media segment in the MP timeline alignment event; and emsg.presentation_time_delta and emsg.timescale may separately represent a value of the presentation_time_delta field and a timescale value within the MP timeline alignment event message.

The apparatus may further include a second acquisition module. The second acquisition module may be configured to acquire the media segment carrying the MP timeline alignment event message.

The second acquisition module may include: a second acquisition unit, a third determination unit and a third acquisition unit. The second acquisition unit may be configured to acquire a scheme message scheme identifier (scheme_id_uri) field and an event value (value) field. The third determination unit may be configured to determine an inband event stream (InbandEventStream) element in an MPD by using a value of the scheme_id_uri field and a value of the value field. The third acquisition unit may be configured to acquire a media segment corresponding to the InbandEventStream element as the media segment.

The external timeline may include a TS timeline.

According to a further embodiment of the disclosure, a media processing method for adaptive streaming is also provided. The method may include the following acts.

An MP timeline alignment event message carried in a media segment may be acquired.

A location of an external media resource and an External MPT (EMPT) of the external media resource mapped to an MP timeline may be determined according to the MP timeline alignment event message.

The MP timeline alignment event message may at least include:

a message data (message_data) field, configured to provide a Uniform Resource Locator (URL) of the external media resource in an MP timeline alignment event.

The MP timeline alignment event message may at least include:

a presentation time delta (presentation_time_delta) field, configured to provide a Media Presentation time delta, on the MP timeline, of the EMPT of the external media resource in an MP timeline alignment event relative to an Earliest Presentation Time (EPT) in the media segment.

The MP timeline alignment event message may further include:

an event message scheme identifier (scheme_id_uri) field, configured to provide an event message scheme identifier; and an event value (value) field, configured to provide an event value.

The act of determining, according to the MP timeline alignment event message, the location of the external media resource may include the following act.

A value of the message_data field in the MP timeline alignment event message may be determined as the location of the external media resource.

The act of determining, according to the MP timeline alignment event message, the EMPT of the external media resource mapped to the MP timeline may include the following act.

The EMPT of the external media resource mapped to the MP timeline may be determined according to the EPT in the media segment and a value of the presentation_time_delta field in the MP timeline alignment event message.

The act of determining, according to the MP timeline alignment event message, the EMPT of the external media resource mapped to the MP timeline may further include the following act.

If the presentation_time_delta field in the MP timeline alignment event message is set to 0, the Media Presentation time of the media segment may be determined to be aligned to an external timeline.

In the embodiment, the EMPT of the external media resource may be equal to the EPT in the media segment.

The act of determining, according to the MP timeline alignment event message, the EMPT of the external media resource mapped to the MP timeline may further include the following act.

MP timeline alignment event messages shall have a same message identifier (id) field value for the same external media resource in the MP timeline alignment event, and the MP timeline alignment event messages shall document the following:

$$EMPT^{id}=ept_i^{id}+emsg_i^{id}.presentation\_time\_delta/emsg_i^{id}.timescale,$$

where $EMPT^{id}$ is the EMPT of the external media resource in the MP timeline alignment event on the MP timeline after a mapping between the MP timeline and the external timeline has been established;

$ept_i^{id}$ is an EPT of an $i^{th}$ media segment in the MP timeline alignment event;

$emsg_i^{id}$.presentation_time_delta is a value of the presentation time delta field in an $i^{th}$ MP timeline alignment event message;

$emsg_i^{id}$.timescale is a value of a timescale field in an $i^{th}$ MP timeline alignment event message; and i is a positive integer.

The act of acquiring the MP timeline alignment event message carried in the media segment may further include the following acts.

An inband event stream (InbandEventStream) element in an MPD may be accessed.

In the embodiment, a value of a schemeIdUri attribute of the InbandEventStream element may be equal to a value of a scheme_id_uri field in the MP timeline alignment event message, and a value attribute value of the InbandEventStream element may be equal to a value of a value field in the MP timeline alignment event message.

The MP timeline alignment event message carried in the media segment corresponding to the InbandEventStream element may be acquired.

According to yet another embodiment of the disclosure, a media processing apparatus for adaptive streaming is also provided. The apparatus may include: a third acquisition module and a third determination module.

The third acquisition module may be configured to acquire an MP timeline alignment event message carried in a media segment.

The third determination module may be configured to determine, according to the MP timeline alignment event message, a location of an external media resource and an EMPT of the external media resource mapped to an MP timeline.

The MP timeline alignment event message may at least include:

a message data (message_data) field, configured to provide a URL of the external media resource in an MP timeline alignment event.

The MP timeline alignment event message may at least include:

a presentation time delta (presentation_time_delta) field, configured to provide a Media Presentation time delta, on the MP timeline, of the EMPT of the external media resource in an MP timeline alignment event relative to an EPT in the media segment.

The MP timeline alignment event message may further include:

an event message scheme identifier (scheme_id_uri) field, configured to provide an event message scheme identifier; and an event value (value) field, configured to provide an event value.

The third determination module may include a fourth determination unit.

The fourth determination unit may be configured to determine a value of the message_data field in the MP timeline alignment event message as the location of the external media resource.

The third determination module may include a fifth determination unit.

The fifth determination unit may be configured to determine the EMPT of the external media resource mapped to the MP timeline according to the EPT in the media segment and a value of the presentation_time_delta field in the MP timeline alignment event message.

The third determination module may further include: a sixth determination unit.

The sixth determination unit may be configured to, if the presentation_time_delta field in the MP timeline alignment event message is set to 0, determine the Media Presentation time of the media segment to be aligned to an external timeline.

In the embodiment, the EMPT of the external media resource may be equal to the EPT in the media segment.

The third determination module may further include a seventh determination unit.

The seventh determination unit may be configured to determine that MP timeline alignment event messages shall have a same message identifier (id) field value for the same external media resource in the MP timeline alignment event, and the MP timeline alignment event messages shall document the following:

$$EMPT_i^{id} = ept_i^{id} + emsg_i^{id}.presentation\_time\_delta/emsg_i^{id}.timescale,$$

where $EMPT^{id}$ is the EMPT of the external media resource in the MP timeline alignment event on the MP timeline after a mapping between the MP timeline and the external timeline has been established;

$ept_i^{id}$ is an EPT of an $i^{th}$ media segment in the MP timeline alignment event;

$emsg_i^{id}.presentation\_time\_delta$ is a value of the presentation time delta field in an $i^{th}$ MP timeline alignment event message;

$emsg_i^{id}.timescale$ is a value of a timescale field in an $i^{th}$ MP timeline alignment event message; and i is a positive integer.

The third acquisition module may further include a second access unit and a fourth acquisition unit. The second access unit may be configured to access an inband event stream (InbandEventStream) element in an MPD. In the embodiment, a value of a schemeIdUri attribute of the InbandEventStream element may be equal to a value of a scheme_id_uri field in the MP timeline alignment event message, and a value attribute value of the InbandEventStream element may be equal to a value of a value field in the MP timeline alignment event message. The fourth acquisition unit may be configured to acquire the MP timeline alignment event message carried in the media segment corresponding to the InbandEventStream element.

By means of the solution in some embodiments of the disclosure, an MP timeline alignment event message carried in a media segment may be acquired; an aligned media segment may be determined according to the MP timeline alignment event message, where the aligned media segment may be a media segment of which an MPT in an MP timeline is aligned to an external timeline; and one or more MPTs of one or more media segments in an MP timeline alignment event after a mapping between the MP timeline and the external timeline has been established may be calculated. A problem caused by employing a single reference clock may be solved, thereby achieving media synchronization playing under a hybrid delivery mode of a broadcast network and a broadband network.

DETAILED DESCRIPTION OF THE EMBODIMENTS

An improved signaling mechanism for a problem of media synchronization playing under a hybrid delivery mode in a broadcast network and a broadband network is described herein.

Figure 1:
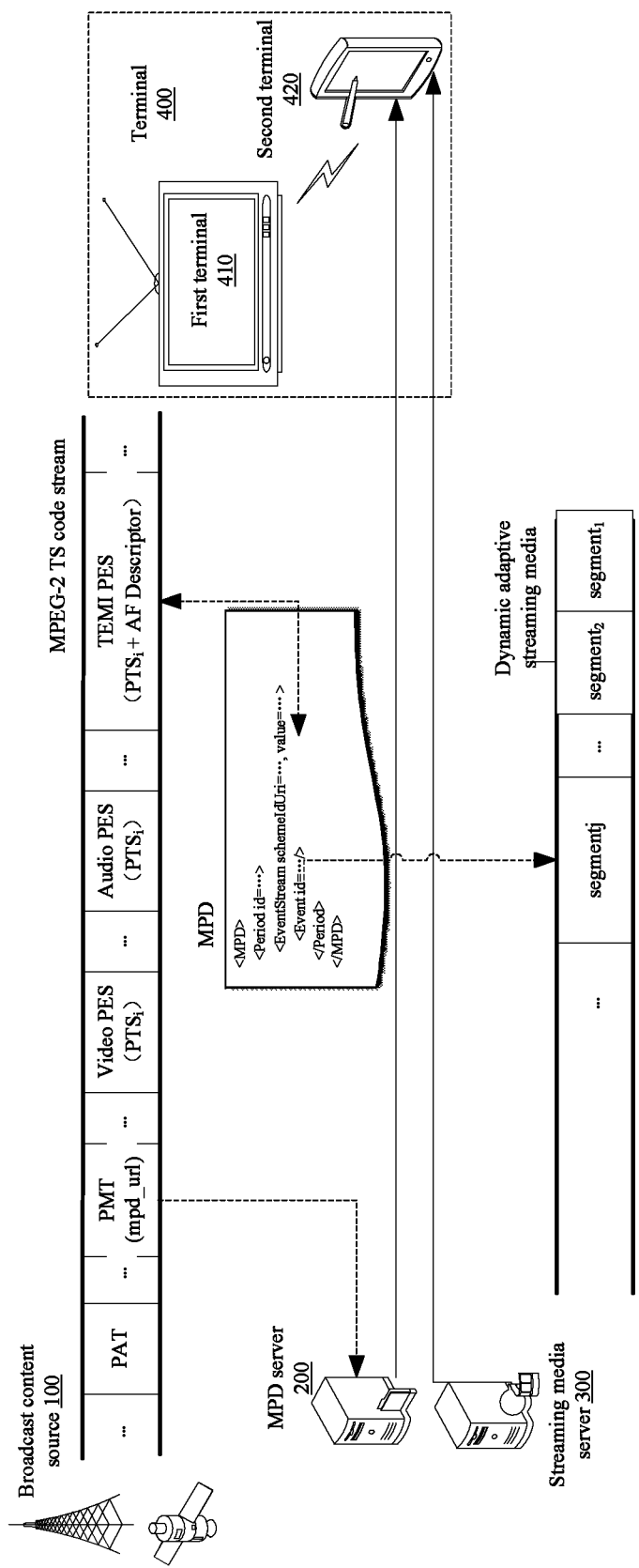
FIG. 1 is a structure diagram of a first broadcast/broadband hybrid delivery media synchronization system according to an embodiment of the disclosure.

An embodiment of the disclosure provides a broadcast/broadband hybrid delivery (also referred to as transmission) media synchronization system. FIG. 1 is a structure diagram of a first broadcast/broadband hybrid delivery media synchronization system according to an embodiment of the disclosure. As shown in FIG. 1, the system may include: a broadcast content source 100, an MPD server 200, a streaming media server 300, a first terminal 410 and a second terminal 420. The first terminal and the second terminal may be two independent terminals, and functions of the two terminals may be implemented in a physical terminal. The system as shown in FIG. 1 will be illustrated hereinbelow.

The broadcast content source 100 may adopt an MPEG-2 standard or may adopt other standards. The MPEG-2 standard is taken for illustration hereinbelow. According to an MPEG-2 standard coding model, the broadcast content source 100 may input audio data and video data into respective coders for compression and coding at a sending end, so as to obtain an Elemental Stream (ES) of an audio/video. The ES may be divided into groups by a packager to form Packet Elemental Streams (PES) with different lengths. The PESs may enter a code stream multiplexer together with program content information, condition receiving information and the like, so as to generate a Program Stream (PS) or a TS.

An MPEG-2 TS payload sent by the broadcast content source 100 may carry PESs with different Packet Identifications (PID). The PID value may be a Program Association Table (PAT) corresponding to a TS of 0x0000. The PAT may define all programs in the TS and provide program initialization information. The PAT is a complete list of all the programs in the TS, and indicates program numbers of different programs and a PID of a Program Map Table (PMT) associated with program contents. The PMT shows a correspondence between program numbers and TSs of audios/videos contained therein and other contents, and a set of programs is completely defined. Information such as a program number of a program, a PCR PID, a stream type (e.g., audio, video and other data) and a PES PID (pointing out a TS packet PID carrying audio and video contents) may be contained. In addition, an MPEG-2 TS may also carry Timeline and External Media Information (TEMI PES), configured to indicate time information and location information of an external media resource carried in the MPEG-2 TS.

In the following embodiment, there may be multiple implementation manners for involved adaptive streaming media (or referred to as dynamic adaptive streaming media). For example, DASH may be adopted. The MPD server and a streaming media server are illustrated hereinbelow by taking DASH as an example. The following embodiment is also applicable to other adaptive streaming media technologies.

The MPD server 200 may provide storage of an MPD file in dynamic adaptive streaming media The MPD file may describe a duration of each media segment, a URL and media attributes such as a video resolution and an adaptation bit rate. The MPD file may provide, for a DASH client, sufficient HTTP-URL information configured to access a streaming media content resource. When the DASH client starts to play a video, the DASH client may select to download a media segment applicable to a current available network bandwidth and a terminal buffer situation according to the information in the MPD file and may play the media segment.

The streaming media server 300 may complete generation of an original video slice and an MPD file. A video file may be segmented, and stored in a hierarchical form consisting of a period, a representation and a segment. According to a request, the streaming media server 300 may return an appropriate media slice to a terminal.

The terminal 400 may include: a first terminal 410 such as a digital television set-top box or a broadcast/broadband dual-mode set-top box; and a second terminal 420 such as a tablet computer, a smart phone and handheld television equipment.

After having received an MPEG-2 TS, the terminal 400 (first terminal 410 and/or second terminal 420, referred to as terminal hereinafter for convenience of description) may distribute the MPEG-2 TS to different resolution channels according to different PIDs, an audio PES and a video PES may be resolved, reorganized into ES streams and stored in caches corresponding to an audio and a video respectively. Firstly, a channel of a demultiplexing module may be specified to be bonded with a TS of which a PID value may be 0x0000, and a PAT may be resolved from the TS, so as to obtain a PID of a PMT of a needed program. By channel binding, a PMT may be found, and time information such as a PCR in the code stream and a PTS of an audio/video PES in a relevant program may be extracted.

The following embodiments and exemplary implementation manners have been protected in a Patent Application No. 201410856623.9, and are now excerpted as follows. Some contents of these embodiments and exemplary implementations may also be applied to the embodiments of the disclosure.

A media processing method for dynamic adaptive streaming provided in the present embodiment will be illustrated hereinbelow with reference to the structure in FIG. 1.

In an exemplary implementation manner, after having received an MPEG-2 TS, the terminal 400 may also extract a specific-type Adaptation Field (AF) descriptor carried in a TEMI PES and a PES header field PTS corresponding to the specific-type AF descriptor, configured to acquire location information and time information of dynamic adaptive streaming media.

In an exemplary implementation manner, the terminal may request the MPD server 200 to acquire an MPD file of the dynamic adaptive streaming media according to the location information. The terminal 400 may resolve the obtained MPD file to determine a media segment needing to be timeline-aligned with the MPEG-2 TS in the dynamic adaptive streaming media.

In an exemplary implementation manner, the terminal 400 may determine a PTS of an MPT of a media segment (including: a timeline alignment media segment and a subsequent media segment in the same period) in the dynamic adaptive streaming media relative to an MPEG-2 TS timeline according to the time information.

In an exemplary implementation manner, the terminal may send an HTTP request periodically through a quality adaptation algorithm to obtain a media segment with an appropriate code rate or quality version in the dynamic adaptive streaming media, and may achieve audio and video synchronization processing according to audio/video PES PTS in the relevant program of the MPEG-2 TS and PTS information of the media segment in the dynamic adaptive streaming media.

Figure 2:
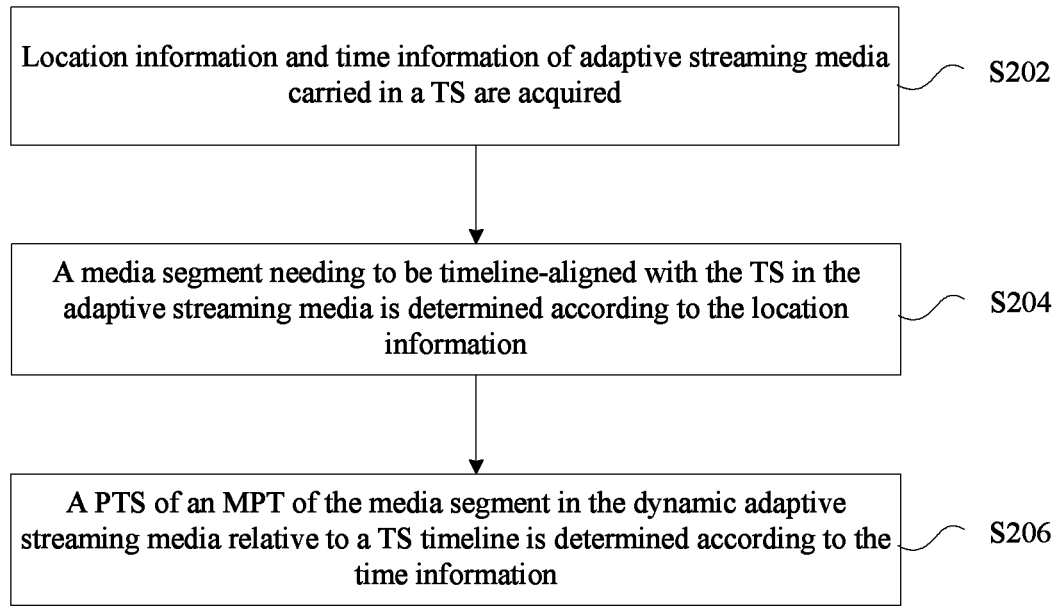
FIG. 2 is a flowchart of a media processing method for dynamic adaptive streaming according to an embodiment of the disclosure.

FIG. 2 is a flowchart of a media processing method for dynamic adaptive streaming according to an embodiment of the disclosure. As shown in FIG. 2, the flow may include the acts as follows.

At act S202, location information and time information of adaptive streaming media carried in a TS may be acquired.

At act S204, a media segment needing to be timeline-aligned with the TS in the adaptive streaming media may be determined according to the location information.

At act S206, a PTS of an MPT of the media segment in the dynamic adaptive streaming media relative to a TS timeline may be determined according to the time information.

By means of the above acts, by utilizing location information and time information of adaptive streaming media carried in a TS, a media segment needing to be timeline-aligned with the TS in the adaptive streaming media and a corresponding PTS may be determined. By virtue of the solution, a problem caused by employing a single reference clock to transmit hybrid media composed of a broadcast network and a broadband network may be solved, media synchronization processing under a hybrid transmission mode may be more efficient, and meanwhile, the extensibility of service deployment may be improved.

The location information and the time information may be acquired at act S202. The acquisition of the location information and the time information is illustrated hereinbelow with reference to exemplary implementations.

Figure 3:
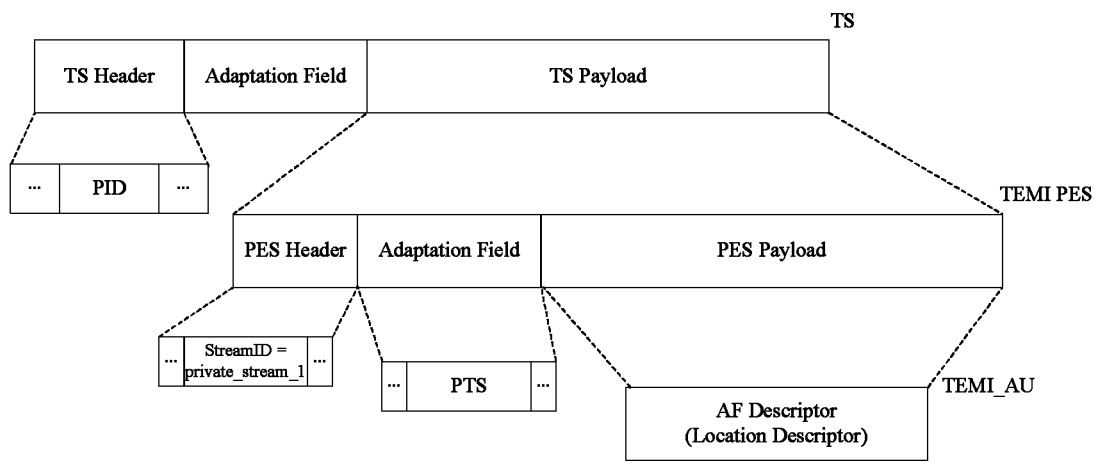
FIG. 3 is a diagram of an acquired adaptive streaming media location descriptor according to an exemplary embodiment of the disclosure.

The location information at act S202 may be a location descriptor. FIG. 3 is a diagram of an acquired adaptive streaming media location descriptor according to an exemplary embodiment of the disclosure. As shown in FIG. 3, a location descriptor may be an AF descriptor, which may be carried in a PES data payload, and a PTS time value may be carried in a PES extension header field.

In an exemplary implementation manner, a terminal firstly may resolve to obtain a PMT in a TS, determine a PID of a TEMI PES of which a stream type value is a predetermined value (e.g., 0x26) from the PMT, bind the PID to a demultiplexing module channel, and filter out a TS packet containing the TEMI PES. A streamID value of the TEMI PES may be private_stream_1.

The terminal may extract an AF descriptor (namely a location descriptor of dynamic adaptive streaming media), of which an af_descr_tag value is a predetermined value (e.g., 0x05) and a service_type value is a predetermined value (e.g., 0x01), carried in a TEMI PES data payload TEMI_AU, so as to acquire location information of the dynamic adaptive streaming media.

Referring to FIG. 3, the terminal may acquire a TEMI PES in the TS, and extract a PTS contained in an extension header field of the TEMI PES to serve as a PTS value corresponding to the location descriptor of the dynamic adaptive streaming media, so as to acquire time information of the dynamic adaptive streaming media.

Figure 4:
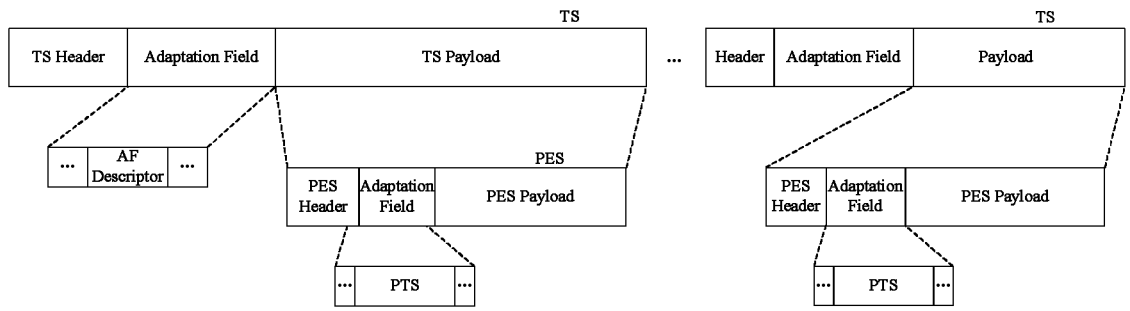
FIG. 4 is a diagram of another acquired adaptive streaming media location descriptor according to an exemplary embodiment of the disclosure.

The location information may also be carried in another manner. FIG. 4 is a diagram of another acquired adaptive streaming media location descriptor according to an exemplary embodiment of the disclosure. As shown in FIG. 4, an AF descriptor may be carried in an AF of a TS.

According to MPEG-2 standard PES syntax illustrations, a streamID may indicate which one of audio, video and data stream is carried in a PES payload. Referring to FIG. 4 in the disclosure, the terminal may acquire a specific media component (video or audio) TS of which an extension_descriptor_tag value is a predetermined value (e.g., 0x04) in the TS.

The terminal may extract an AF descriptor (namely a location descriptor of dynamic adaptive streaming media), of which an af_descr_tag value is a predetermined value (0x05) and a service_type value is a predetermined value (e.g., 0x01), carried in a specific media component TS AF, so as to acquire location information of the dynamic adaptive streaming media.

Referring to FIG. 4, the terminal may acquire a specific media component (video or audio) TS in the TS, and extract a PTS contained in a PES extension header field carried in a specific media component (video or audio) TS payload to serve as a PTS value corresponding to a location descriptor of dynamic adaptive streaming media, so as to acquire time information of the dynamic adaptive streaming media.

Alternatively, the terminal may acquire a first subsequent TS having the same PID value as the specific media component (video or audio) TS and a TS of which a payload_unit_start_indicator value is 1 in the TS header field, and extract a PTS contained in a PES extension header field carried in a TS payload to serve as a PTS value corresponding to a location descriptor of dynamic adaptive streaming media, so as to acquire time information of the dynamic adaptive streaming media.

In the above embodiments and exemplary implementation manners, the existing location descriptor is extended. Table 1 shows a syntax structure chart for an adaptive streaming media location descriptor according to the embodiment of the disclosure.

TABLE 1

| Syntax | Nb bits | Mnemonic |
|---|---|---|
| temi_location_descriptor { | | |
|   af_descr_tag | 8 | uimsbf |
|   af_descr_length | 8 | uimsbf |
|   force_reload | 1 | uimsbf |
|   is_announcement | 1 | uimsbf |
|   splicing_flag | 1 | uimsbf |
|   use_base_temi_url | 1 | uimsbf |
|   reserved | 5 | uimsbf |
|   timeline_id | 7 | uimsbf |
|   if (is_announcement) { | | |
|     timescale | 32 | uimsbf |
|     time_before_activation | 32 | uimsbf |
|   } | | |
|   if (!use_base_temi_url) { | | |
|     url_scheme | 8 | uimsbf |
|     url_path_length | 8 | uimsbf |
|     for (i=0;i<url_path_length;i++) { | 8 | uimsbf |
|       url_path | | |
|     } | | |
|   } | | |
|   nb_addons | 8 | uimsbf |
|   for (i=0;i <nb_addons ;i++) { | 8 | uimsbf |
|     service_type | | |
|     if (service_type==0) { | 8 | uimsbf |
|       mime_length | | |
|       for (j=0;j<mime_length;j++) { | 8 | uimsbf |
|         mime_type | | |
|       } | | |
|     } | | |
|     if (service_type==1) { | 8 | uimsbf |
|       event_schemeIdUri_length | | |
|       for (j=0;j< event_schemeIdUri_length;j++) { | 8 | uimsbf |
|         event_schemeIdUri | | |
|       } | 8 | uimsbf |
|       event_stream_value | 8 | uimsbf |
|       event_id | 8 | uimsbf |
|       mpd_url_length | | |
|       for (j=0;j< mpd_url_length;j++) { | 8 | uimsbf |
|         mpd_url | | |
|       } | | |
|     } | 8 | uimsbf |
|     url_subpath_len | | |
|     for (j=0;j< url_subpath_len;j++) { | 8 | uimsbf |
|       addon_location | | |
|     } | | |
|   } | | |
| } | | |

As shown in Table 1, an extension definition of a location descriptor of adaptive streaming media in the present embodiment is as follows, and is illustrated by taking a DASH service type as an example.

timeline_id: a unique identifier of a location descriptor in an MPEG-2 TS;

force_reload: a 1-bit tag, indicating whether to reload an MPD before DASH synchronization (timeline alignment for a media segment);

is_announcement: a 1-bit tag, indicating that a DASH media segment corresponding to a location descriptor has not been in a playing (activation) state;

time_before_activation: indicating remaining time of a resource (DASH media segment) that is referenced by a location descriptor and enters a playing state;

timescale: a timescale unit, configured to represent a time_before_activation field time value;

service_type: indicating a service type of an external resource referenced by a location descriptor, where when service_type==1, the service type is 'MPEG-DASH', and in this case, location information carried in the location descriptor may be configured to achieve mapping between an MPT of a DASH media segment and a PTS in an MPEG-2 TS, namely to complete synchronization between DASH streaming media and the MPEG-2 TS.

As shown in Table 1, location information for establishing a mapping between DASH streaming media time information and TS time information is referred to as a timeline alignment event stream in the embodiment of the disclosure, the definition being as follows:

event_stream_schemeIdUri: when service_type==1, a location descriptor may contain an event_stream_schemeIdUri field, which may follow a Uniform Resource Name (URN) or URL grammatical norms, and may be configured to uniquely identify a scheme of a timeline alignment event stream;

event_stream_value: when service_type==1, a location descriptor may contain an event_stream_value field, and a value space of the event_stream_value field may be defined by a message scheme of a timeline alignment event stream identified by event_schemeIdUri, and may be configured to identify an event stream in an event stream scheme;

event_id: when service_type==1, a location descriptor may contain an event_id field, which may be configured to identify an event in a timeline alignment event stream.

The event_stream_schemeIdUri field and the event_stream_value_field together may uniquely identify the timeline alignment event stream, and the event_id field may be configured to uniquely identify a certain specific timeline alignment event in the timeline alignment event stream.

Alternatively, mpd_url: when service_type==1, the value of mpd_url may be a URL of an MPD of DASH corresponding to a location descriptor.

In an exemplary embodiment, the terminal may acquire an MPD descriptor of adaptive streaming media contained in a PMT, which may be defined as shown in Table 2 and is illustrated by taking DASH as an example.

TABLE 2

| Syntax | No. of bits | Format |
|---|---|---|
| MPD_descriptor{ | | |
|   descriptor_tag | 8 | uimsbf |
|   descriptor_length | 8 | uimsbf |
|   for (i □ □0; i □ □N; i□ □ ) { | | |
|     mpd_url | 8 | bslbf |
|   } | | |
| } | | |

The value of mpd_url may be a URL of an MPD of DASH corresponding to an adaptive streaming media location descriptor.

The media segment needing to be timeline-aligned with the TS in the adaptive streaming media may be determined according to the location information at act S204. This will be illustrated hereinbelow with exemplary implementations.

In a dynamic adaptive streaming media technology, an MPD may be a document, the document containing metadata needed for constructing a media segment HTTP-URL by a DASH client, in order that the client may access the media segment to provide streaming media service for a user.

The MPD may contain an event, configured to signal non-periodic information to the DASH client or a DASH application. The event may be time-controlled, that is, the event may start from a certain specific MPT and may usually last for a period of time. The event may include a DASH-specific informing event and an application-specific event.

In correspondence to a timeline alignment event contained in the location descriptor, a period element in the MPD may contain timeline alignment EventStream sub-elements.

An EventStream@schemeIdUri attribute may be configured to uniquely identify a message scheme of a timeline alignment event stream. An EventStream@value attribute may serve as a value of the timeline alignment event stream, and a value space of the EventStream@value attribute may be defined by the message scheme of the timeline alignment event stream identified by event_schemeIdUri. EventStream elements may include a series of timeline alignment event elements of the same type, and may be uniquely identified by an Event.id attribute value.

In the present embodiment, the terminal may acquire corresponding MPDs according to location information in accordance with different methods.

The terminal may extract an MPD descriptor of dynamic adaptive streaming media contained in a PMT, and may acquire a URL of an MPD of the dynamic adaptive streaming media corresponding to the location information according to an mpd_url field value contained therein.

Alternatively, the terminal may extract a location descriptor of dynamic adaptive streaming media, and may acquire a URL of an MPD of the dynamic adaptive streaming media corresponding to the location information according to an mpd_url field value contained therein.

There may be multiple manners for determining a media segment, needing to be timeline-aligned with a TS, of dynamic adaptive streaming media according to location information of the dynamic adaptive streaming media and a corresponding MPD. Different manners are adopted for illustration hereinbelow.

Figure 5:
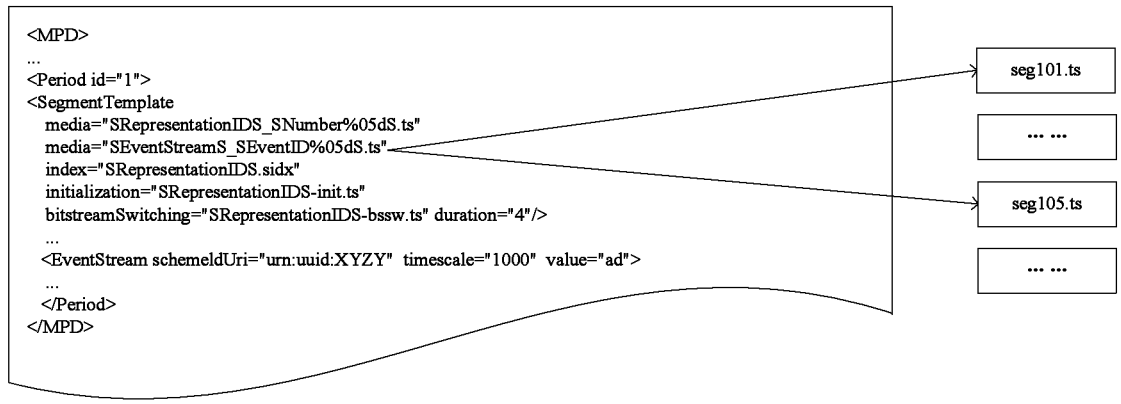
FIG. 5 is an example chart of a method for determining a media segment needing to be timeline-aligned according to an embodiment of the disclosure.

FIG. 5 is an example chart of a method for determining a media segment needing to be timeline-aligned according to an embodiment of the disclosure. As shown in FIG. 5, the example may be implemented as follows.

Figure 6:
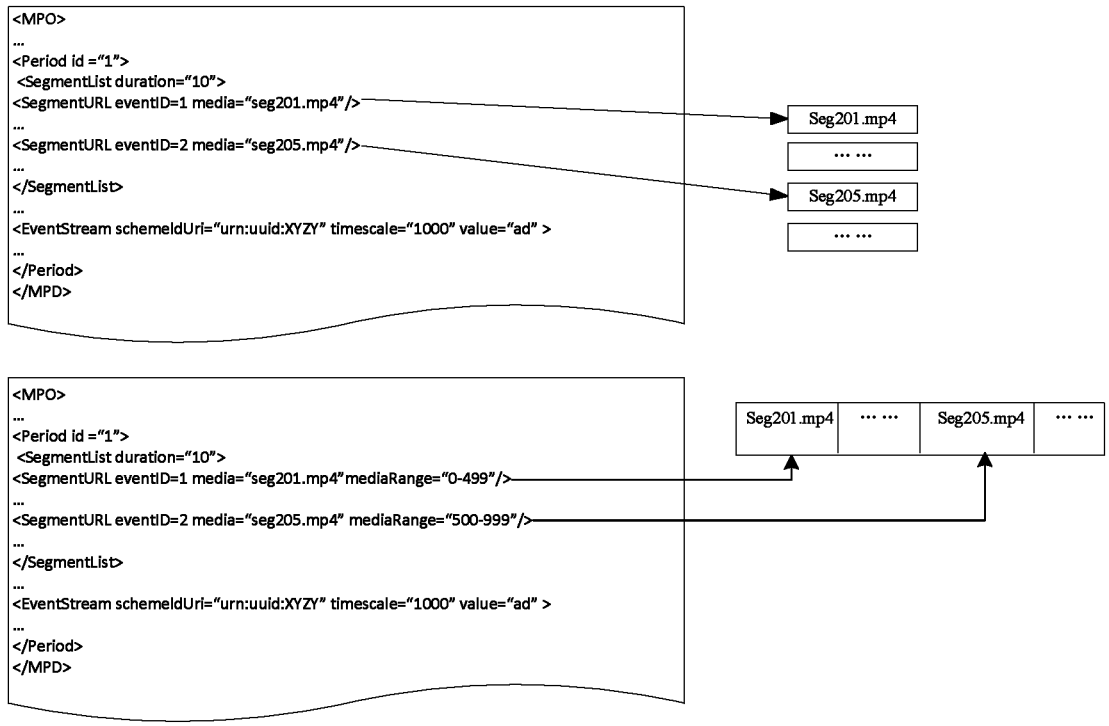
FIG. 6 is an example chart of another method of determining media segment needing to be timeline-aligned according to an embodiment of the disclosure.

A terminal may make retrieval to determine a period element, i.e., a period element of which an @id attribute value is "1" in FIG. 6, in an MPD according to an event stream scheme id field and an event stream value field carried in a location descriptor. The value of the event stream scheme id field may be "urn:uuid:XYZY", and the value of the event stream value field may be "ad".

The terminal may replace an $EventStream$ identifier of a @media attribute in a media segment template sub-element of the period element with the event stream scheme id field value "urn:uuid:XYZY" and the event stream value field value "ad" carried in the location descriptor, and may replace an $EventID$ identifier of the @media attribute in the media segment template sub-element of the period element with the event_id field value "1" carried in the location descriptor. Meanwhile, in conjunction with a BaseURL element defined in other layers of an MPD, e.g., "http://www.example.com/", an HTTP URL, namely "http://www.example.com/uuid:XYZY/ad_00001.ts", of a media segment, needing to be timeline-aligned with a TS, of dynamic adaptive streaming media may be constructed.

In correspondence to an event_id field value "2" in a next location descriptor of the same type carried in the TS, a constructed HTTP URL of a next media segment, needing to be timeline-aligned with the TS, of the dynamic adaptive streaming media may be "http://www.example.com/uuid:XYZY/ad_00002.ts", and so on.

FIG. 6 is an example chart of another method of determining media segment needing to be timeline-aligned according to an embodiment of the disclosure. As shown in FIG. 6, the example may be implemented as follows.

Figure 7:
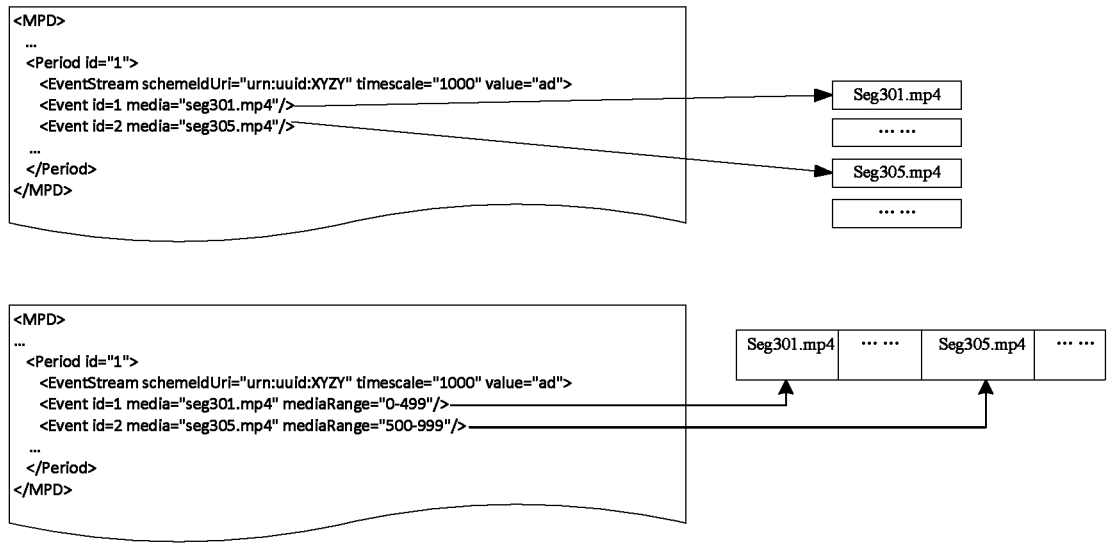
FIG. 7 is an example chart of still another method of determining media segment needing to be timeline-aligned according to an embodiment of the disclosure.

A terminal may make retrieval to determine a period element, i.e., a period element of which an @id attribute value is "1" in FIG. 7, in an MPD according to an event stream scheme id field and an event stream value field carried in a location descriptor. The value of the event stream scheme id field may be "urn:uuid:XYZY", and the value of the event stream value field may be "ad".

The terminal may make retrieval to determine a SegmentURL sub-element under this period element, i.e., a SegmentURL sub-element of which an @eventID attribute value is "1" in FIG. 7, in an MPD according to an event id field carried in the location descriptor, the value of the event id field being "1".

According to @media and @mediaRange attribute values of the SegmentURL element, in conjunction with a BaseURL element defined in other layers of an MPD, e.g., "http://www.example.com/", the terminal may construct an HTTP URL, namely "http://www.example.com/seg201.mp4", of a media segment, needing to be timeline-aligned with a TS, of dynamic adaptive streaming media, and an optional interval request header field "Range: bytes=0-499".

In correspondence to an event id field value "2" in a next location descriptor of the same type carried in the TS, a constructed HTTP URL of a next media segment, needing to be timeline-aligned with the TS, of the dynamic adaptive streaming media may be "http://www.example.com/seg205.mp4", and an optional interval request header field may be "Range:bytes=500-999", and so on.

FIG. 7 is an example chart of still another method of determining media segment needing to be timeline-aligned according to an embodiment of the disclosure. As shown in FIG. 7, the example may be implemented as follows.

A terminal may make retrieval to determine a period element, i.e., a period element of which an @id attribute value is "1" in FIG. 7, in an MPD according to an event stream scheme id field and an event stream value field carried in a location descriptor. The value of the event stream scheme id field may be "urn:uuid:XYZY", and the value of the event stream value field may be "ad".

The terminal may make retrieval to determine an Event sub-element under this period element, i.e., an Event sub-element of which an @id attribute value is "1" in FIG. 7, in an MPD according to an event id field carried in the location descriptor, the value of the event id field being "1".

According to @media and @mediaRange attribute values of the Event element, in conjunction with a BaseURL element defined in other layers of an MPD, e.g., "http://www.example.com/", the terminal may construct an HTTP URL, namely "http://www.example.com/seg301.mp4", of a media segment, needing to be timeline-aligned with a TS, of dynamic adaptive streaming media, and an optional interval request header field "Range:bytes=0-499".

In correspondence to an event_id field value "2" in a next location descriptor of the same type carried in the TS, a constructed HTTP URL of a next media segment, needing to be timeline-aligned with the TS, of the dynamic adaptive streaming media may be "http://www.example.com/seg305.mp4", and an optional interval request header field may be "Range:bytes=500-999", and so on.

In an exemplary embodiment, when determining the media segment to be timeline-aligned with the TS, the example may further include the following acts:

The terminal may extract a force_reload tag in the location descriptor of the dynamic adaptive streaming media, and if the value of the force_reload tag is 0x01, the MPD of the dynamic adaptive streaming media may be reloaded.

In an exemplary embodiment, when determining the media segment needing to be timeline-aligned with the TS, the example may further include the following acts:

The terminal may extract an i_announcement tag in the location descriptor of the dynamic adaptive streaming media, and if the value of the is_announcement tag is 0x01, a time_before_activation field and a timescale field in the location descriptor of the dynamic adaptive streaming media may be extracted.

In an exemplary embodiment, when determining the media segment needing to be timeline-aligned with the TS, the example may further include the following acts. The force_reload tag may be extracted from the location information; and under the condition that the value of the force_reload tag is a predetermined value, the MPD of the DASH may be reloaded.

In another exemplary embodiment, when determining the media segment needing to be timeline-aligned with the TS, the example may further include the following acts. The is_announcement tag may be extracted from the location information; and under the condition that the value of the is_announcement tag is a predetermined value, the time_before_activation field and the timescale field may be extracted from the location information.

The PTS of the MPT of the media segment in the adaptive streaming media relative to the TS timeline may be determined according to the time information at act S206. This will be illustrated hereinbelow with exemplary embodiments.

One of the main characteristics of DASH is that coding versions of different media components may share a globally uniform timeline. A presentation time of an access unit in a media content may be mapped to a globally uniform presentation timeline, in order to synchronize different media components and achieve the same seamless switching between different coding versions of the same media component.

The presentation time within each period may be obtained by subtracting a value representative of @presentationTimeOffset namely $T_O$ from a PeriodStart time relative to a corresponding period. This means that the value of an MPT of an access unit having a presentation time $T_P$ in a media stream relative to PeriodStart may be $T_M=T_P-T_O$.

According to a media segment timeline rule of dynamic adaptive streaming media defined by the MPD, MPTs of all media segments in a period may have a predetermined relationship, and may be successive, for example. Therefore, an MPT of a subsequent media segment in the period may be calculated according to an MPT of a media segment.

In an exemplary embodiment of the disclosure, the terminal may determine, according to an MPT of a media segment needing to be timeline-aligned with a TS, an MPT of a subsequent media segment in a period within which the media segment exists. Particularly, when the MPT of the media segment needing to be timeline-aligned is expressed as a PTS relative to a TS timeline, the following relationship may exist:

$$Segment_sPTS \text{ (in seconds)}=[(S-Ssyn)*@duration]/SegmentBase.timescale+Segment_{syn}PTS \text{ (in seconds)}.$$

In the above formula, Ssyn is a sequence number of a media segment, needing to be timeline-aligned, of dynamic adaptive streaming media, and S is a sequence number of any other subsequent media segment in a period.

$Segment_{syn}$ PTS is a PTS of an MPT of a media segment, needing to be timeline-aligned, of dynamic adaptive streaming media relative to a TS timeline. Segment PTS may be a PTS of an MPT of any other subsequent media segment in a period relative to a TS timeline.

In the above formula, @duration and SegmentBase.timescale are a @duration attribute value and a @timescale attribute value of a period element of a media segment respectively.

In an exemplary embodiment of the disclosure, the terminal may determine a PTS of an MPT of a media segment, needing to be timeline-aligned, of dynamic adaptive streaming media relative to a TS timeline according to a PTS value corresponding to a location descriptor of the dynamic adaptive streaming media, i.e., $$Segment_{syn}PTS \text{ (in seconds)}=PTS_i/90000,$$

where $PTS_i$ is a PTS value corresponding to a location descriptor of dynamic adaptive streaming media.

$Segment_{syn}$ PTS may be a PTS of an MPT of a media segment, needing to be timeline-aligned, of dynamic adaptive streaming media relative to a TS timeline.

Figure 8:
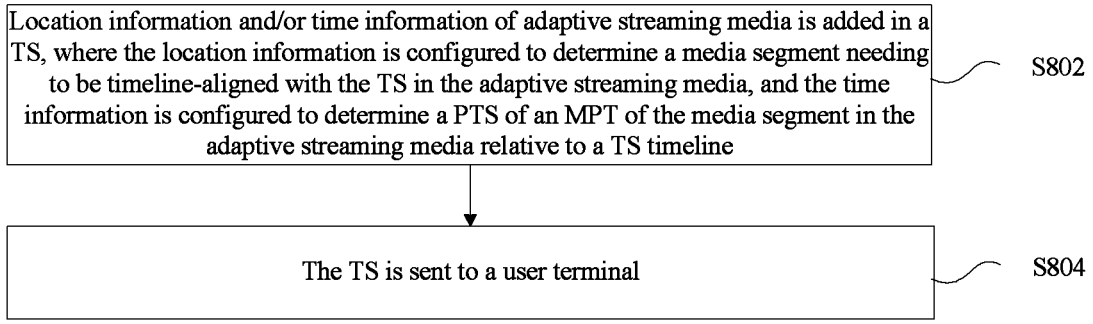
FIG. 8 is a flowchart of a TS processing method according to an embodiment of the disclosure.

FIG. 8 is a flowchart of a TS processing method according to an embodiment of the disclosure. As shown in FIG. 8, the flow may include the acts as follows.

At act S802, location information and/or time information of adaptive streaming media may be added in a TS. The location information may be configured to determine a media segment needing to be timeline-aligned with the TS in the adaptive streaming media, and the time information may be configured to determine a PTS of an MPT of the media segment in the adaptive streaming media relative to a TS timeline.

At act S804, the TS may be sent to a user terminal.

By means of the acts, a TS added with a predetermined type of code stream may be sent to a user terminal, so that a problem caused by employing a single reference clock to transmit hybrid media composed of a broadcast network and a broadband network may be solved, media synchronization processing under a hybrid transmission mode may be more efficient, and meanwhile, the extensibility of service deployment may be improved.

In an exemplary embodiment, when the location information of the adaptive streaming media is added and carried in the TS, a method may be adopted as follows. A PID may be added in a PMT of the TS. The PID may be configured to acquire a TEMI PES of which a stream type value is a predetermined value, and the TEMI PES may carry location information.

After the location information of the adaptive streaming media is added, time information of the adaptive streaming media may also be added. In an exemplary embodiment, adding and carrying time information of the adaptive streaming media in the TS may include: carrying time information in an extension header field of the TEMI PES.

In an exemplary embodiment, when the location information of the adaptive streaming media is added and carried in the TS, a method may be adopted as follows. A specific media component TS of which an extension descriptor tag value is a predetermined value may be carried in the TS, and a TS AF may carry location information.

After the location information of the adaptive streaming media is added, time information of the adaptive streaming media may also be added. In an exemplary embodiment, adding and carrying time information of the adaptive streaming media in the TS may include: carrying a PTS in a PES extension header field of a TS payload. The PTS value may be configured to determine the time information of the adaptive streaming media.

The time information of the adaptive streaming media may be added and carried in the TS by adopting the following method. A subsequent TS of a specific media component TS in the TS and the specific media component TS may be set to have the same PID value and an initial indicator value of a payload data unit in a TS header field may be set to a predetermined value. A PTS may be carried in a PES extension header field of a subsequent TS payload. The PTS value may determine the time information of the adaptive streaming media.

In an exemplary embodiment, an AF descriptor of which a tag field value is a predetermined value and a service type field value is a predetermined value may be carried in the TS to serve as a location descriptor of the adaptive streaming media, the location descriptor including the location information.

In an exemplary embodiment, the location descriptor may further include at least one of: a unique identifier of a location descriptor in a TS, a force_reload_tag, an is_announcement tag, a time_before_activation tag, a timescale unit, and a service type. The force_reload tag may be configured to indicate whether it is necessary to reload an MPD before media segment timeline alignment. The is_announcement tag may be configured to indicate that a media segment of adaptive media corresponding to a location descriptor has not been in a playing state. The time_before_activation tag may be configured to indicate remaining time of a media segment of adaptive media that corresponds to a location descriptor and enters a playing state. The timescale unit may be configured to indicate a remaining time id field time value. The service type may be configured to indicate a service type of an external resource referenced by a location descriptor.

In an exemplary embodiment, the TS may also carry information configured to determine an MPD of the adaptive streaming media corresponding to the location information.

In an exemplary embodiment, an MPD descriptor may be carried in a PMT in the TS. The MPD descriptor may include a URL of the MPD corresponding to the location information; or, the URL of the MPD may be acquired from the location information.

A media processing apparatus for adaptive streaming is provided in an embodiment. The apparatus may be configured to implement the above-mentioned embodiment and exemplary implementation manner. Those which have been illustrated will not be elaborated herein. Just as a term 'module' used below, the combination of software and/or hardware with predetermined functions may be implemented. Although the apparatus described by the following embodiment is better implemented by software, the implementation of hardware or the combination of software and hardware may be possible and conceived.

Figure 9:
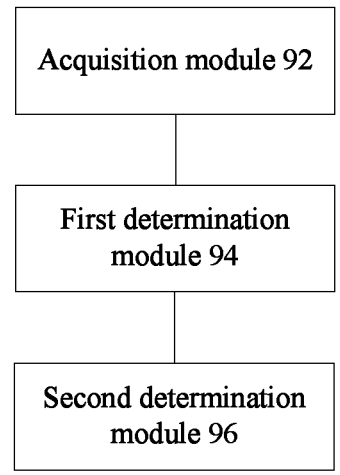
FIG. 9 is a structure block diagram of a media processing apparatus for adaptive streaming according to an embodiment of the disclosure.

FIG. 9 is a structure block diagram of a media processing apparatus for adaptive streaming according to an embodiment of the disclosure. As shown in FIG. 9, the apparatus may include an acquisition module 92, a first determination module 94 and a second determination module 96, and the media processing apparatus for adaptive streaming will be illustrated hereinbelow.

The acquisition module 92 may be configured to acquire location information and time information of adaptive streaming media carried in a TS. The first determination module 94 may be coupled to the acquisition module 92, and may be configured to determine a media segment needing to be timeline-aligned with the TS in the adaptive streaming media according to the location information. The second determination module 96 may be coupled to the first determination module 94, and may be configured to determine a PTS of an MPT of the media segment in the adaptive streaming media relative to a TS timeline.

Figure 10:
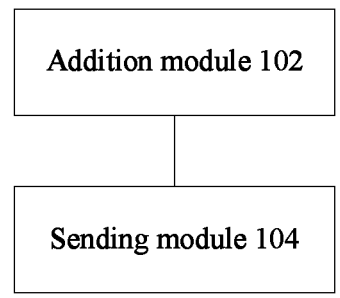
FIG. 10 is a structure block diagram of another media processing apparatus for adaptive streaming according to an embodiment of the disclosure.

FIG. 10 is a structure block diagram of another media processing apparatus for adaptive streaming according to an embodiment of the disclosure. As shown in FIG. 10, the apparatus may include an addition module 102 and a sending module 104, and the media processing apparatus for adaptive streaming will be illustrated hereinbelow.

The addition module 102 may be configured to add location information and/or time information of adaptive streaming media in a TS. The location information may be configured to determine a media segment needing to be timeline-aligned with the TS in the adaptive streaming media, and the time information may be configured to determine a PTS of an MPT of the media segment in the adaptive streaming media relative to a TS timeline. The sending module 104 may be coupled to the addition module 102, and may be configured to send the TS to a user terminal. The above embodiments and exemplary implementation manners have been protected in a Patent Application No. 201410856623.9, and are excerpted as above.

An event may be informed through an MPD. The events of the same type may form an EventStream, and may be described in an EventStream element in a Period element. The event may be ended when a corresponding period is finished.

In an exemplary embodiment, the event may also be informed through an inband event. For example, event information may serve as a part of a media segment, and may be added to a Segment, so as to transmit the EventStream through a Representation. The EventStream may exist in a Representation associated with one or more Adaptationsets, or may exist in all Representations.

The Representation carrying the inband event should be identified in an MPD, so as to signal the Representation to a client. An InbandEventStream element may be used to specify an InbandEventStream in the MPD, and the element may appear in AdaptationSet and Representation levels. If a Representation contains more InbandEventStreams, each InbandEventStream may be specified by an independent InbandEventStream element.

Figure 11:
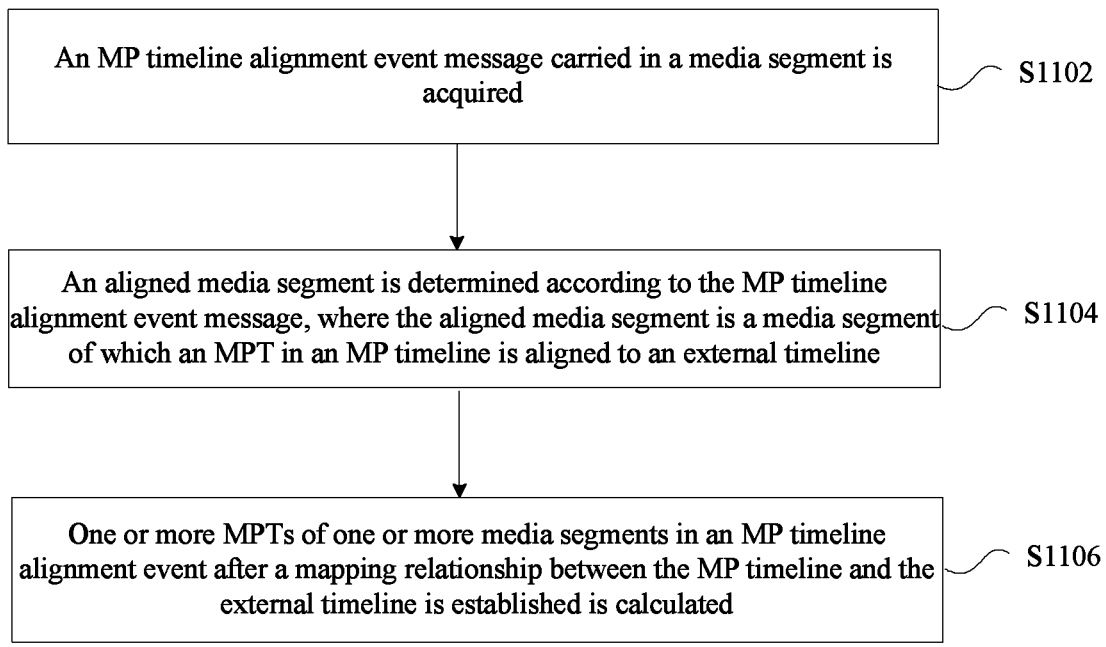
FIG. 11 is a flowchart of another media processing method for adaptive streaming according to an embodiment of the disclosure.

FIG. 11 is a flowchart of another media processing method for adaptive streaming according to an embodiment of the disclosure. As shown in FIG. 11, the method may include the acts as follows.

At act S1102, an MP timeline alignment event message carried in a media segment may be acquired.

At act S1104, an aligned media segment may be determined according to the MP timeline alignment event message. The aligned media segment may be a media segment of which an MPT in an MP timeline is aligned to an external timeline.

At act S1106, one or more MPTs of one or more media segments in an MP timeline alignment event after a mapping between the MP timeline and the external timeline has been established may be calculated.

By means of the acts, a media segment having an MPT aligned to an external timeline may be determined according to an MP timeline alignment event message carried in the media segment, and one or more MPTs of one or more media segments in an MP timeline alignment event after a mapping between the MP timeline and the external timeline has been established may be calculated. A problem caused by employing a single reference clock to transmit hybrid media composed of a broadcast network and a broadband network may be solved, media synchronization processing under a hybrid transmission mode may be more efficient, and meanwhile, the extensibility of service deployment may be improved.

Alignment of an external timeline, an MP timeline and a timeline is involved in the above acts, and will be illustrated hereinbelow.

External Timeline

In the present embodiment, the external timeline is illustrated by taking MPEG-2 TS PCR/PTS clock information as an example, and an audio/video coding mode in other formats may also serve as the external timeline.

According to an MPEG-2 standard coding model, an MPEG-2 TS payload sent by a broadcast content source may carry a PES having different PIDs. After having received an MPEG-2 TS, a terminal may distribute the MPEG-2 TS to different resolution channels according to different PIDs, an audio PES and a video PES may be resolved, reorganized into ES streams and stored in caches corresponding to an audio and a video respectively. Firstly, a channel of a demultiplexing module may be specified to be bond with a TS of which a PID value is 0x0000, and a PAT may be resolved from the TS, so as to obtain a PID of a PMT of a needed program. By channel binding, a PMT may be found, and time information such as a PCR in the code stream and a PTS of an audio/video PES in a relevant program may be extracted.

In addition, the MPEG-2 TS may also carry TEMI PES, configured to indicate an external media resource synchronized with the MPEG-2 TS. Correspondingly, after having received the MPEG-2 TS, the terminal may acquire location information of the external media resource by extracting a specific-type AF descriptor carried in the TEMI PES, and may establish a correspondence with time information (TEMI PES header field PTS value) in an MPEG-2 TS timeline.

MP Timeline

DASH is taken as an example for illustration in the present embodiment. One of the main characteristics of the DASH is that coding versions of different media components share a globally uniform timeline. A presentation time of an access unit in a media content may be mapped to a globally uniform presentation timeline, in order to synchronize different media components and achieve seamless switching between different coding versions of the same media component.

The presentation time within each period may be obtained by subtracting a value representative of @presentationTimeOffset namely $T_O$ from a PeriodStart time relative to a corresponding period. This means that the value of an MPT of an access unit having a presentation time $T_P$ in a media stream relative to PeriodStart may be $T_M = T_P - T_O$.

Timeline Alignment

An obvious method for solving timeline alignment refers to: delivering an adaptive stream and an external media stream by employing a single reference clock. For example, the MPEG-2 TS PCR/PTS clock information may also be contained in an IP message such as an RTP and an HTTP for transmission. The main defects of the method may be that broadcast media and broadband media resources are deployed in a binding manner, so as not to facilitate system extension. Moreover, the PCR clock information may be changed during demultiplexing, and the clock continuity cannot be maintained.

Figure 12:
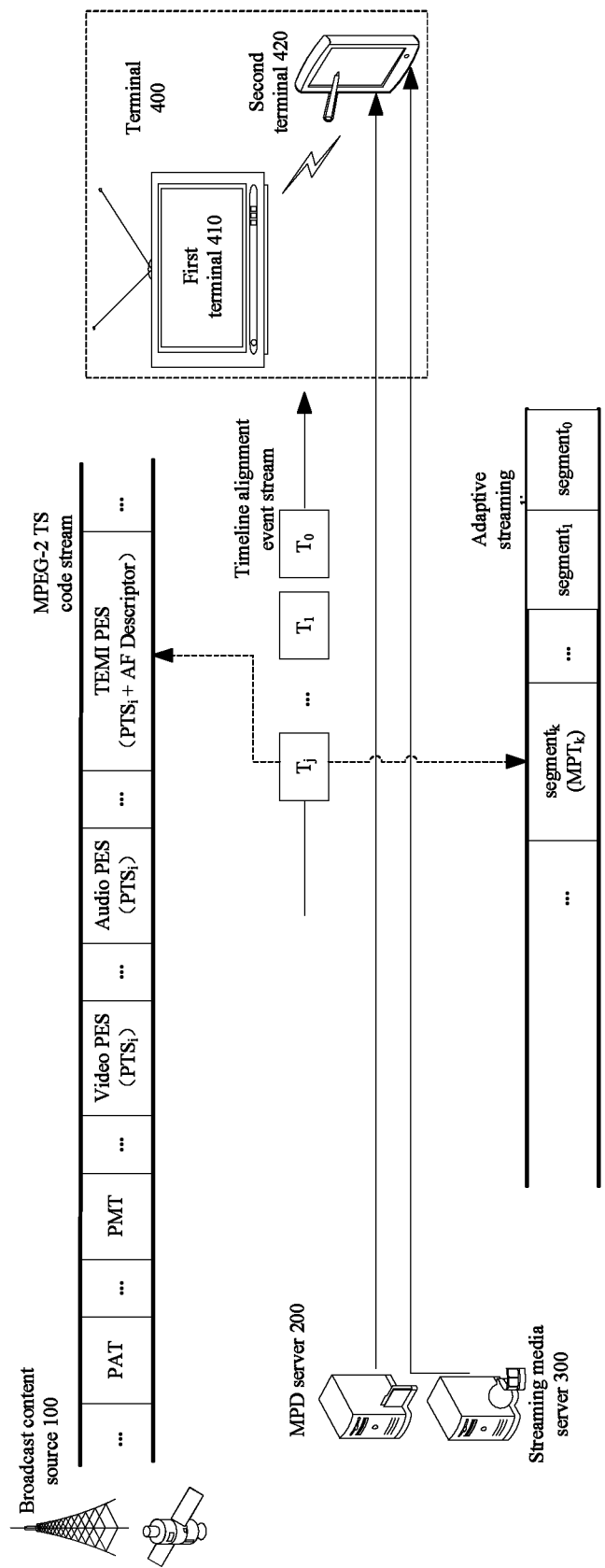
FIG. 12 is a structure diagram of a second broadcast/broadband hybrid delivery media synchronization system according to an embodiment of the disclosure.

For this, the present embodiment provides a "timeline alignment event stream" scheme independent of specific media stream clock information, which may be used to establish a mapping between an MP timeline of an adaptive stream and an external timeline. FIG. 12 is a structure diagram of a second broadcast/broadband hybrid delivery media synchronization system according to an embodiment of the disclosure. As shown in FIG. 12, the broadcast content source 100, the MPD server 200, the streaming media server 300, the first terminal 410 and the second terminal 420 have been elaborated in relevant description in FIG. 1, and will not be elaborated herein.

The present embodiment defines a "media presentation timeline alignment" event, an "MP timeline alignment" event for short, configured to signal to a client that an MPT of a media segment will be mapped to an external timeline, such as MPEG-2 TS PCR/PTS clock information or vice versa. In FIG. 12, a "timeline alignment event stream" may carry a series of time progresses (or locations) $T_j$ representative of a timeline alignment event, $T_j$ signaling may be added to a media stream, and a mapping between time information in each timeline and $T_j$ may be established, i.e., ($PTS_i$, $T_j$) and ($MPT_k$, $T_j$) in FIG. 12, and a mapping between an MP timeline and an external timeline may be established.

Key elements for alignment between the MP timeline and the external timeline are as shown in Table 3.

TABLE 3

| | Time information | Progress (location) information |
|---|---|---|
| External media stream: adopting MPEG-2 TS timeline as an example | PCR/PTS clock information: TEMI PES header field PTS value | TEMI PES location descriptor |
| Adaptive stream: MP timeline | MPT: MPT ($T_M = T_P - T_O$) | //TBD |

Accordingly, it may be suggested to define an MP timeline alignment signaling mechanism for adaptive streaming media, which may support carrying of timeline alignment progress (location) information and an MPT corresponding to the timeline alignment progress (location) information.

In the above embodiment, information of an MP timeline alignment event may be an MP timeline alignment event message box. In an exemplary embodiment, act S1102 of acquiring the MP timeline alignment event message carried in the media segment may include the following acts. An inband event stream (InbandEventStream) element in an MPD may be accessed. The MP timeline alignment event message carried in the media segment corresponding to the InbandEventStream element may be acquired.

The InbandEventStream element may include: an event stream scheme identifier (schemeIdUri) attribute and an event stream value (value) attribute, configured to indicate the MP timeline alignment event.

In an exemplary embodiment, the MP timeline alignment event message may include at least one of: a presentation time delta (presentation_time_delta) field, configured to provide time for the MP timeline alignment event; an event duration (event_duration) field, configured to represent an MP remaining duration; and a message data (message_data) field, configured to provide a presentation time $T_P$ of the aligned media segment relative to a period start time (PeriodStart time).

The MP timeline alignment event message may further include: a scheme message scheme identifier (scheme_id_uri) field and an event value (value) field. In the embodiment, a value of the scheme_id_uri field may be equal to a value of an event stream scheme identifier (SchemeIdUri) attribute, and a value of the value field may be equal to a value of an event stream value (value) attribute.

There may be multiple determination manners for determining the aligned media segment according to the MP timeline alignment event message. In an exemplary embodiment, the act of determining the media segment may include: if a value of the presentation_time_delta field in the MP timeline alignment event message is set to a predetermined value, determining the media segment to be aligned to the external timeline.

In an exemplary embodiment, the method may further include the following act. The MPT of the aligned media segment may be calculated based on the presentation time $T_P$ in the message_data field in the MP timeline alignment event message and a value of a presentation time offset $T_O$ attribute of a Representation where the aligned media segment is located. The MPT of the aligned media segment may be $T_M = T_P - T_O$.

The one or more MPTs of the one or more media segments may be calculated in the following manners. One or more media segments, having a same id field value, in the MP timeline alignment event message may be determined as the one or more media segments in the MP timeline alignment event. The one or more MPTs of the one or more media segments in the MP timeline alignment event may be calculated according to a value of the presentation_time_delta field and a value of a timescale field within the MP timeline alignment event message.

The one or more MPTs of the one or more media segments in an MP timeline alignment event may be calculated according to a value of the presentation_time_delta field in the MP timeline alignment event message and the timescale field value in the following manners. The one or more MPTs of the one or more media segments in the MP timeline alignment event may be calculated according to a following formula: MPT=MPT$_0$+emsg.presentation_time_delta/emsg.timescale, where MPT$_0$ and MPT may separately represent the MPT of the aligned media segment in the MP timeline alignment event and MPT of a subsequent media segment in the MP timeline alignment event; and emsg.presentation_time_delta and emsg.timescale may separately represent a value of the presentation_time_delta field and a timescale value within the MP timeline alignment event message.

In an exemplary embodiment, before acquiring the MP timeline alignment event message carried in the media segment, the method may further include the following act. The media segment carrying the MP timeline alignment event message may be acquired.

The media segment carrying the MP timeline alignment event message may be acquired in the following manners. A scheme message scheme identifier (scheme_id_uri) field and an event value (value) field may be acquired. An inband event stream (InbandEventStream) element in an MPD may be determined by using a value of the scheme id_uri_field and a value of the value field. A media segment corresponding to the InbandEventStream element may be acquired as the media segment.

In an exemplary embodiment, the external timeline may include a TS timeline.

Figure 13:
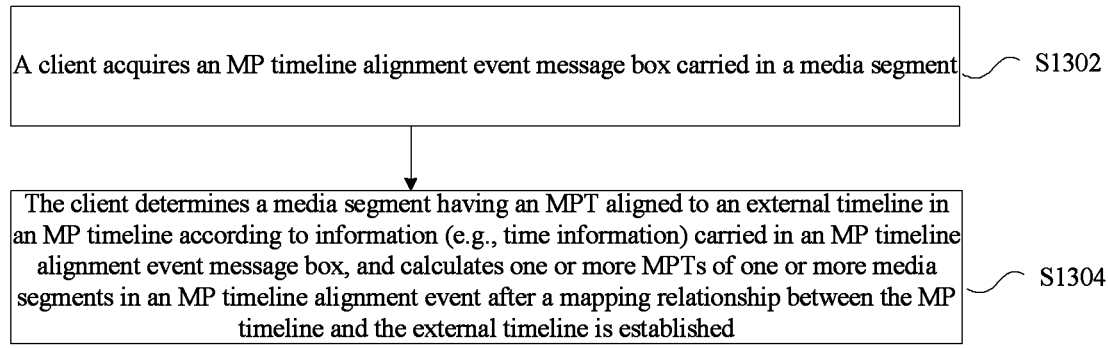
FIG. 13 is a flowchart of a media processing method for dynamic adaptive streaming according to an exemplary embodiment of the disclosure.

The MP timeline alignment event message may be acquired at act S1102 in FIG. 11. In an exemplary implementation manner, the MP timeline alignment event message may be implemented by using an MP timeline alignment event message box, or may be implemented by using other manners. In FIG. 13, an exemplary embodiment where the MP timeline alignment event message box is used is illustrated.

FIG. 13 is a flowchart of a media processing method for dynamic adaptive streaming according to an exemplary embodiment of the disclosure. As shown in FIG. 13, the flow may include the acts as follows.

At act S1302, a client may acquire an MP timeline alignment event message box carried in a media segment.

In an MPD, an inband event stream (InbandEventStream) element of an "MP timeline alignment" inband event stream may be specified to contain: a @schemeIdUri attribute, configured to provide a URI to specify an event stream scheme, for example, "urn:avs:dash:event:2014"; and an optional @value attribute, configured to specify an event stream element value, for example, "3". The URI of an identification mechanism may be a URN or a URL.

1. An event message box may be used in the present alternative element

In a dynamic adaptive streaming media technology, an event message box ('emsg') may be configured to signal an ordinary inband event associated with an MPT, a universal grammar definition being as follows:

```
Aligned(8) class DASHEventMessageBox extends FullBox( 'emsg',
    version = 0, flags = 0) {
    string          scheme_id_uri;
    string          value;
    unsigned int(32)    timescale;
    unsigned int(32)    presentation_time_delta;
    unsigned int(32)    event_duration;
    unsigned int(32)    id;
    unsigned int(8)     message_data[ ];
}
``` where
scheme_id_uri: identifying an event message scheme;
value: specifying an event value;
timescale: specifying a timescale;
presentation_time_delta: specifying a presentation time delta;
event_duration: specifying a duration of an event on an MPT;
id: identifying a message example;
message_data[ ]: a message body.

According to the solution in the present embodiment, if a "scheme_id_uri" field in an event message box is set to a predetermined value, for example, "urn:avs:dash:event:2014" and a "value" field is set to a predetermined value, for example, "3", then the event message box may be an "MP timeline alignment" event message box, and the fields in the event message box shall document the following:

the "presentation_time_delta" field may provide an MP timeline alignment event time, representing a Media Presentation time delta of a media segment (having the same "id" field value) in an MP timeline alignment event, starting from establishment of a time information mapping between an MP timeline and an external timeline;

the "event_duration" field may represent an MP remaining duration starting from the MP timeline alignment event time, if the value of "event_duration" is set to "0", MP may be ended after the MP timeline alignment event time, and if the value of "event_duration" is set to "0xFFFF", the MP remaining duration is unknown;

the "message_data[ ]" field may provide a presentation time ($T_P$) of a segment having an MPT aligned to an external timeline in an MP timeline relative to a period start time (PeriodStart time).

At act S1304, the client may determine a media segment having an MPT aligned to an external timeline in an MP timeline according to information (e.g., time information) carried in an MP timeline alignment event message box, and may calculate one or more MPTs of one or more media segments in an MP timeline alignment event after a mapping between the MP timeline and the external timeline has been established.

In this event message box, if the "presentation_time_delta" field is set to "0", the Media Presentation time of the segment is aligned to the external timeline in the MP timeline. On the basis of presentation time $T_P$ of a "message_data[ ]" field and a @presentationTimeOffset ($T_O$) of a Representation, the MPT of the aligned segment in the MP timeline alignment event may be calculated, i.e., $T_M = T_P - T_O$.

Event message boxes carried by different segments in the MP timeline alignment event shall have the same "id" field value and different "presentation_time_delta" field values. A Media Presentation time delta of segments corresponding to message instances having the same "id" field value may be calculated, and may represent Media Presentation time of a relevant segment in the MP timeline alignment event after the mapping between the MP timeline and the external timeline has been established, i.e., $$MPT = MPT_0 = emsg.presentation\_time\_delta/emsg.timescale,$$

where $MPT_0$ and MPT may separately represent an MPT of an aligned segment in the MP timeline alignment event and an MPT of a subsequent segment in the MP timeline alignment event; and the emsg.presentation_time_delta field and the emsg.timescale field may separately represent the Media Presentation Time Delta and timescale within the MP timeline alignment event message box.

Figure 14:
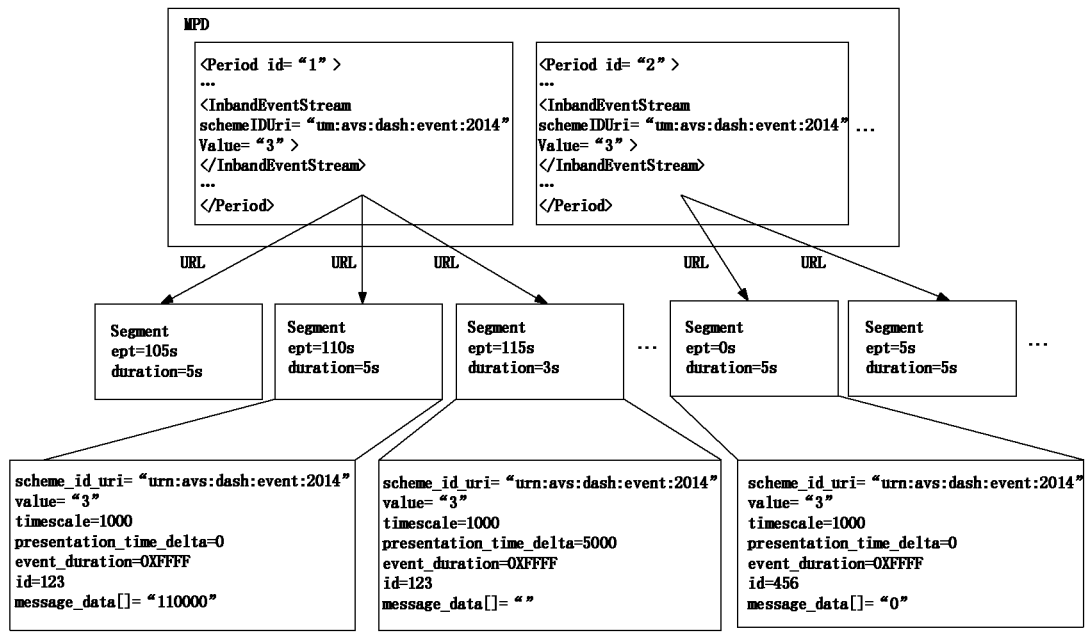
FIG. 14 is an example chart of a method for determining a media segment needing to be timeline-aligned according to an embodiment of the disclosure.

FIG. 14 is an example chart of a method for determining a media segment needing to be timeline-aligned according to an embodiment of the disclosure. As shown in FIG. 14, the example may be implemented as follows.

A terminal may make retrieval to determine InbandEventStream elements in Adaptationset and Representation levels of a Period element in an MPD, i.e., InbandEventStream elements contained by Period elements of which @id attribute values are "1" and "2" respectively in FIG. 14, according to an event stream scheme id field value, for example, "urn:avs:dash:event:2014" and an event stream value field, for example, "3" carried in a location descriptor.

The terminal may construct an HTTP URL of a media segment corresponding to an inband event stream, i.e., a URL having different directions in FIG. 14, by using SegmentTemplate sub-elements or SegmentURL sub-elements of the Period element as well as BaseURL elements defined in other layers of the MPD, for example, "http://www.example.com/".

The terminal may acquire a media segment content according to the HTTP URL request, and extract an event message box carried therein, i.e., "MP timeline alignment" event information defined in the disclosure. The terminal may retrieve an "id" field of an "MP timeline alignment" event message box according to an event id field value, for example, "123" carried in a location descriptor, and determine a media segment corresponding to an event message box of which a "presentation_time_delta" field value is set to "0" in a retrieval result as a media segment of dynamic adaptive streaming media, needing to be timeline-aligned with a TS, i.e., a left first media segment in FIG. 14.

In an exemplary embodiment of the disclosure, the terminal may determine an MPT of a subsequent media segment in a period of the media segment according to the MPT of the media segment needing to be timeline-aligned with the TS. Particularly, when the MPT of the media segment needing to be timeline-aligned is expressed as a PTS of a TS timeline, the following relationship may exist:

$$Segment_s.PTS \text{ (in seconds)} = Segment_{syn}\text{(in seconds)} + emsg.presentation\_time\_delta/emsg.timescale,$$

where subscript syn is a sequence number of a media segment needing to be timeline-aligned (a "presentation_time_delta" field value in a carried "MP timeline alignment" event message box is set to "0");

subscript s is a sequence number of a subsequent media segment (carried "MP timeline alignment" event message boxes shall have the same "id" field value);

emsg.presentation_time_delta is the Media Presentation Time Delta in an "MP timeline alignment" event message box carried by a media segment $Segment_s$;

emsg.timescale is timescale within an "MP timeline alignment" event message box; and $Segment_{syn}.PTS$ and $Segment_s.PTS$ are PTSs of a media segment needing to be timeline-aligned and an MPT of a subsequent media segment relative to a TS timeline respectively.

Figure 21:
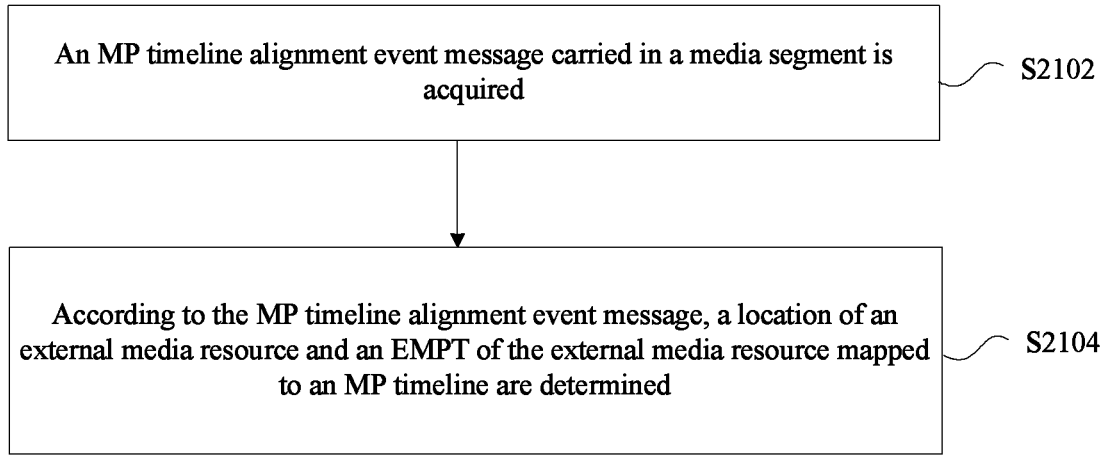
FIG. 21 is a flowchart of another media processing method for adaptive streaming according to an embodiment of the disclosure.

FIG. 21 is a flowchart of another media processing method for adaptive streaming according to an embodiment of the disclosure. As shown in FIG. 21, the method may include the acts as follows.

At act S2102, an MP timeline alignment event message carried in a media segment may be acquired.

At act S2104, a location of an external media resource and an EMPT of the external media resource mapped to an MP timeline may be determined according to the MP timeline alignment event message.

By means of the acts, a media segment having an MPT aligned to an external timeline may be determined according to an MP timeline alignment event message carried in the media segment, and one or more MPTs of one or more media segments in an MP timeline alignment event after a mapping between the MP timeline and the external timeline has been established may be calculated. A problem caused by employing a single reference clock to transmit hybrid media composed of a broadcast network and a broadband network may be solved, media synchronization processing under a hybrid transmission mode may be more efficient, and meanwhile, the extensibility of service deployment may be improved.

The MP timeline alignment event message may be acquired at act S2102 in FIG. 21. In an exemplary implementation manner, the MP timeline alignment event message may be implemented by using an MP timeline alignment event message box, or may be implemented by using other manners. An exemplary embodiment of an MP timeline alignment event message box is illustrated hereinbelow.

MP timeline alignment events may provide an ability to signal, to a client, a location of an external media resource and a presentation time of the external media resource, which is mapped to an MP timeline, i.e., External Media Presentation Time (EMPT).

If a "scheme_id_uri" field in an event message box is set to "urn:avs:dash:event:2014" and a "value" field is set to "3", then the message is an MP timeline alignment event message, and the fields in the MP timeline alignment event message box shall document the following:
  a "presentation_time_delta" field may provide a Media Presentation time delta of External Media Presentation Time (EMPT) of an external media resource in the MP timeline alignment events relative to the earliest presentation time in this segment; and
  a "message_data[ ]" field may provide a URL of the external media resource in the MP timeline alignment events.

In this event message box, if the "presentation_time_delta" field is set to "0", the Media Presentation time of the segment is aligned to the external timeline, i.e., the External Media Presentation Time (EMPT) of the external media resource is equal to the earliest presentation time (EPT) in this segment.

The MP timeline alignment event message box instances shall have the same "id" field value for the same external media resource in the MP timeline alignment events, and the fields in the event message box shall document the following:

$$EMPT_i^{id}=ept_i^{id}+emsg_i^{id}.presentation\_time\_delta/emsg_i^{id}.timescale,$$

where
  the $EMPT_i^{id}$ may represent the External Media Presentation Time (EMPT) of the external media resource in the MP timeline alignment events on the MP timeline after the mapping between the MP timeline and an external timeline has been established;
  the $ept_i^{id}$ may represent the earliest presentation time (EPT) of $Segment_i$ in the MP timeline alignment events; and
  the $emsg_i^{id}.presentation\_time\_delta$ field and the $emsg_i^{id}.timescale$ field may separately represent the Media Presentation Time Delta and timescale within the $i^{th}$ message box of the MP timeline alignment event.

Figure 22:
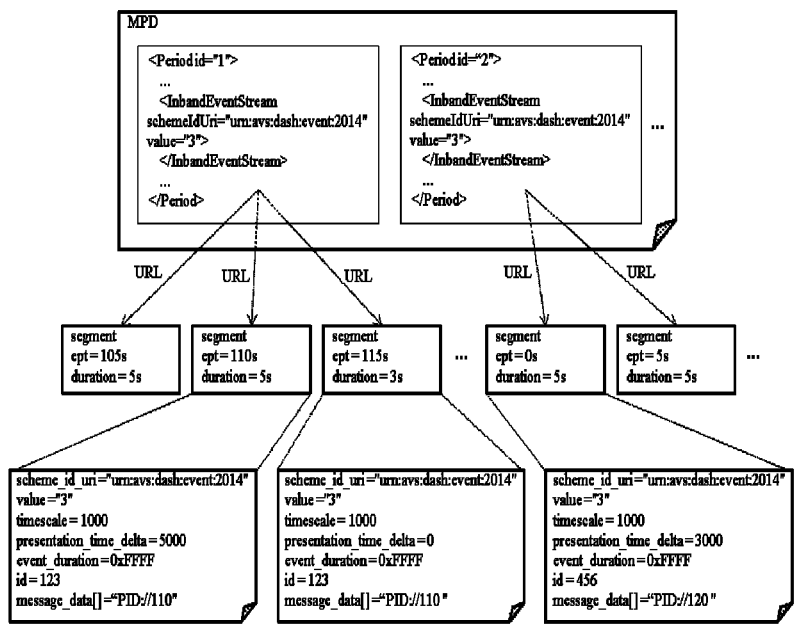
FIG. 22 is an example chart of a method for determining a media segment needing to be timeline-aligned according to an embodiment of the disclosure.

FIG. 22 is an example chart of a method for determining a media segment needing to be timeline-aligned according to an embodiment of the disclosure. As shown in FIG. 22, the example may be implemented as follows.

Multiple Representation elements of an MPD document may contain InbandEventStream elements corresponding to the present event scheme. When it is necessary to establish a mapping between an MPT and external timeline time information, an external media resource may be added to a corresponding MP timeline alignment event message box relative to information such as an earliest presentation_time_delta of a segment and message_data[ ]. An MP timeline alignment event message may appear in multiple segments.

A terminal may make retrieval to determine InbandEventStream elements in Adaptationset and Representation levels of a Period element in an MPD, i.e., InbandEventStream elements contained by Period elements of which @id attribute values are "1" and "2" respectively in FIG. 22, according to an event stream scheme id field value, for example, "urn:avs:dash:event:2014" and an event stream value field, for example, "3".

The terminal may construct an HTTP URL of a media segment corresponding to an inband event stream, i.e., a URL having different directions in FIG. 14, by using SegmentTemplate sub-elements or SegmentURL sub-elements of the Period element as well as BaseURL elements defined in other layers of the MPD, for example, "http://www.example.com/".

The terminal may acquire a media segment content according to the HTTP URL request, and extract an event message box carried therein, i.e., "MP timeline alignment" event information defined in the disclosure. The terminal may retrieve an "id" field of an "MP timeline alignment" event message box according to an event id field value, for example, "123" carried in a location descriptor, and determine a media segment corresponding to an event message box of which a "presentation_time_delta" field value is set to "0" in a retrieval result as a media segment of dynamic adaptive streaming media, needing to be timeline-aligned with an external media resource such as a TS, i.e., a left second media segment in FIG. 22.

Figure 15:
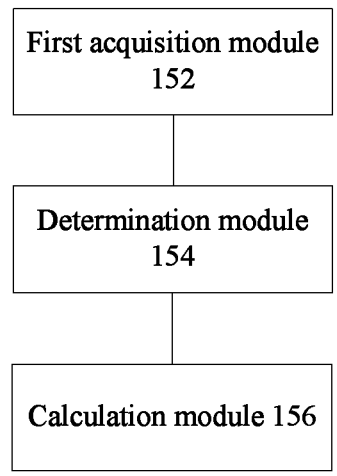
FIG. 15 is a flowchart of another media processing apparatus for adaptive streaming according to an embodiment of the disclosure.

FIG. 15 is a flowchart of another media processing apparatus for adaptive streaming according to an embodiment of the disclosure. As shown in FIG. 15, the apparatus may include a first acquisition module 152, a determination module 154 and a calculation module 156, and the apparatus will be illustrated hereinbelow.

The first acquisition module 152 may be configured to acquire an MP timeline alignment event message carried in a media segment. The determination module 154 may be coupled to the first acquisition module 152, and may be configured to determine an aligned media segment according to the MP timeline alignment event message. The aligned media segment may be a media segment of which an MPT in an MP timeline is aligned to an external timeline. The calculation module 156 may be coupled to the determination module 154, and may be configured to calculate one or more MPTs of one or more media segments in an MP timeline alignment event after a mapping between the MP timeline and the external timeline has been established.

Figure 16:
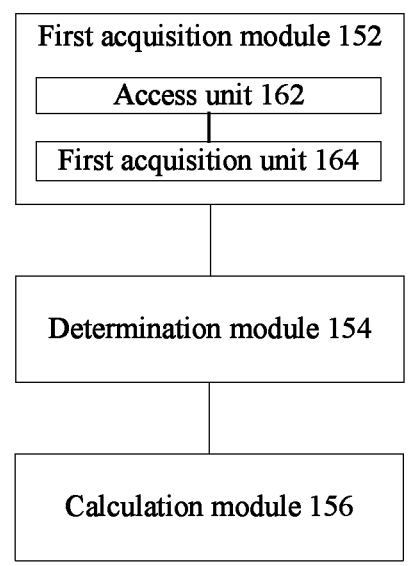
FIG. 16 is a structure block diagram of a first acquisition module in another media processing apparatus for adaptive streaming according to an embodiment of the disclosure.

FIG. 16 is a structure block diagram of a first acquisition module 152 in another media processing apparatus for adaptive streaming according to an embodiment of the disclosure. As shown in FIG. 16, the first acquisition module 152 may include a first access unit 162 and a first acquisition unit 164, and the first acquisition module 152 will be illustrated hereinbelow.

The first access unit 162 may be configured to access an inband event stream (InbandEventStream) element in an MPD. The first acquisition unit 164 may be coupled to the first access unit 162, and may be configured to acquire the MP timeline alignment event message carried in the media segment corresponding to the InbandEventStream element.

Herein, the InbandEventStream element may include: an event stream scheme identifier (schemeIdUri) attribute and an event stream value (value) attribute, configured to indicate the MP timeline alignment event.

In an exemplary embodiment, the MP timeline alignment event message may include at least one of: a presentation time delta (presentation_time_delta) field, configured to provide time for the MP timeline alignment event; an event duration (event_duration) field, configured to represent an MP remaining duration; and a message data (message_data) field, configured to provide a presentation time $T_P$ of the aligned media segment relative to a period start time (PeriodStart time).

Herein, the MP timeline alignment event message may further include: a scheme message scheme identifier (scheme_id_uri) field and an event value (value) field. In this embodiment, a value of the scheme_id_uri field may be equal to a value of an event stream scheme identifier (SchemeIdUri) attribute, and a value of the value field may be equal to a value of an event stream value (value) attribute.

Figure 17:
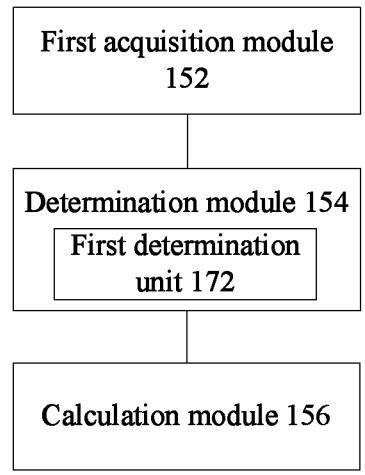
FIG. 17 is a structure block diagram of a determination module in another media processing apparatus for adaptive streaming according to an embodiment of the disclosure.

FIG. 17 is a structure block diagram of a determination module 154 in another media processing apparatus for adaptive streaming according to an embodiment of the disclosure. As shown in FIG. 17, the determination module 154 may include a first determination unit 172, and the determination module 154 will be illustrated hereinbelow.

The first determination unit 172 may be configured to, if a value of the presentation_time_delta field in the MP timeline alignment event message is set to a predetermined value, determine the media segment to be aligned to the external timeline.

In an exemplary embodiment, the apparatus may be further configured to calculate the MPT of the aligned media segment based on the presentation time $T_P$ in the message_data field in the MP timeline alignment event message and a value of a presentation time offset $T_O$ attribute of a Representation where the aligned media segment is located. The MPT of the aligned media segment may be $T_M = T_P - T_O$.

Figure 18:
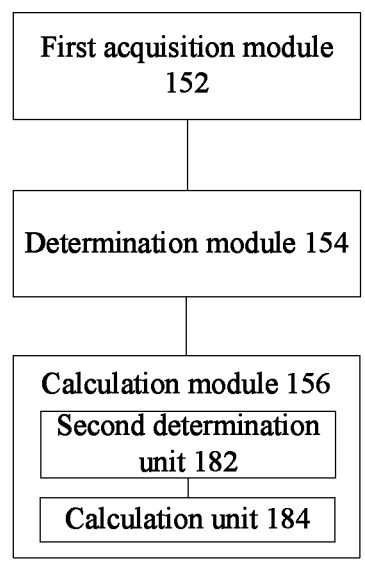
FIG. 18 is a structure block diagram of a calculation module in another media processing apparatus for adaptive streaming according to an embodiment of the disclosure.

FIG. 18 is a structure block diagram of a calculation module 156 in another media processing apparatus for adaptive streaming according to an embodiment of the disclosure. As shown in FIG. 18, the calculation module 156 may include a second determination unit 182 and a calculation unit 184, and the calculation module 156 will be illustrated hereinbelow.

The second determination unit 182 may be configured to determine one or more media segments, having a same id field value, in the MP timeline alignment event message as the one or more media segments in the MP timeline alignment event. The calculation unit 184 may be coupled to the second determination unit 182, and may be configured to calculate the one or more MPTs of the one or more media segments in the MP timeline alignment event according to a value of the presentation_time_delta field and a value of a timescale field within the MP timeline alignment event message.

In an exemplary embodiment, the calculation unit 184 may be configured to calculate the one or more MPTs of the one or more media segments in the MP timeline alignment event according to a following formula: MPT=MPT$_0$+emsg.presentation_time_delta/emsg.timescale. In the embodiment, MPT$_0$ and MPT may separately represent the MPT of the aligned media segment in the MP timeline alignment event and MPT of a subsequent media segment in the MP timeline alignment event; and emsg.presentation_time_delta and emsg.timescale may separately represent a value of the presentation_time_delta field and a timescale value within the MP timeline alignment event message.

Figure 19:
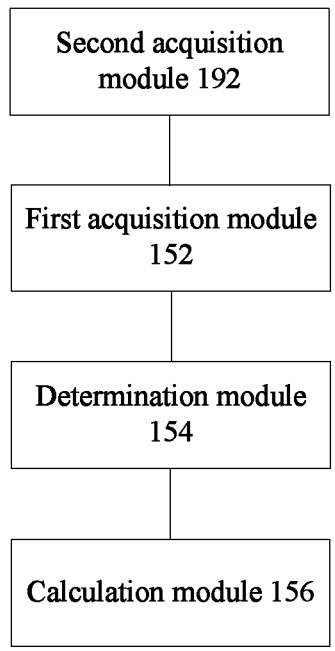
FIG. 19 is an exemplary structure block diagram of another media processing apparatus for adaptive streaming according to an embodiment of the disclosure.

FIG. 19 is an exemplary structure block diagram of another media processing apparatus for adaptive streaming according to an embodiment of the disclosure. As shown in FIG. 19, the apparatus may include, in addition to modules as shown in FIG. 15, a second acquisition module 192, and the apparatus will be illustrated hereinbelow.

The second acquisition module 192 may be coupled to the first acquisition module 152, and may be configured to acquire the media segment carrying the MP timeline alignment event message.

Figure 20:
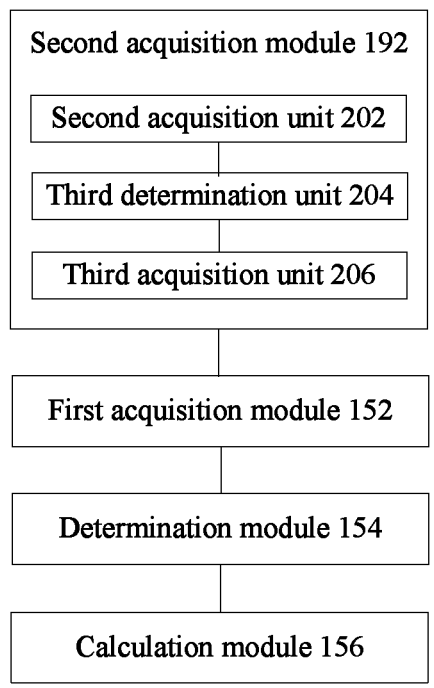
FIG. 20 is a structure block diagram of a second acquisition module in another media processing apparatus for adaptive streaming according to an embodiment of the disclosure.

FIG. 20 is a structure block diagram of a second acquisition module 192 in another media processing apparatus for adaptive streaming according to an embodiment of the disclosure. As shown in FIG. 20, the second acquisition module 192 may include a second acquisition unit 202, a third determination unit 204 and a third acquisition unit 206, and the second acquisition module 192 will be illustrated hereinbelow.

The second acquisition unit 202 may be configured to acquire a scheme message scheme identifier (scheme_id_uri) field and an event value (value) field. The third determination unit 204 may be coupled to the second acquisition unit 202, and may be configured to determine an inband event stream (InbandEventStream) element in an MPD by using a value of the scheme_id_uri field and a value of the value field. The third acquisition unit 204 may be configured to acquire a media segment corresponding to the InbandEventStream element as the media segment.

Figure 23:
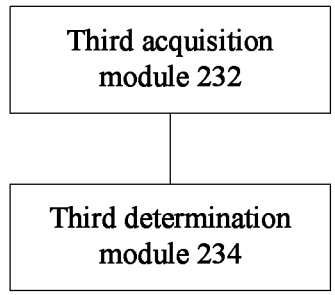
FIG. 23 is a structure block diagram of another media processing apparatus for adaptive streaming according to an embodiment of the disclosure.

FIG. 23 is a structure block diagram of another media processing apparatus for adaptive streaming according to an embodiment of the disclosure. As shown in FIG. 23, the apparatus may include a third acquisition module 232 and a third determination module 234, and the apparatus will be illustrated hereinbelow.

The third acquisition module 232 may be configured to acquire an MP timeline alignment event message carried in a media segment. The third determination module 234 may be coupled to the third acquisition module 232, and may be configured to determine, according to the MP timeline alignment event message, a location of an external media resource and an EMPT of the external media resource mapped to an MP timeline.

In an exemplary embodiment, the MP timeline alignment event message may at least include: a message data (message_data) field, configured to provide a URL of the external media resource in an MP timeline alignment event.

In an exemplary embodiment, the MP timeline alignment event message may at least include: a presentation time delta (presentation_time_delta) field, configured to provide a Media Presentation time delta, on the MP timeline, of the EMPT of the external media resource in an MP timeline alignment event relative to an EPT in the media segment.

In an exemplary embodiment, the MP timeline alignment event message may further include: an event message scheme identifier (scheme_id_uri) field, configured to provide an event message scheme identifier; and an event value (value) field, configured to provide an event value.

Figure 24:
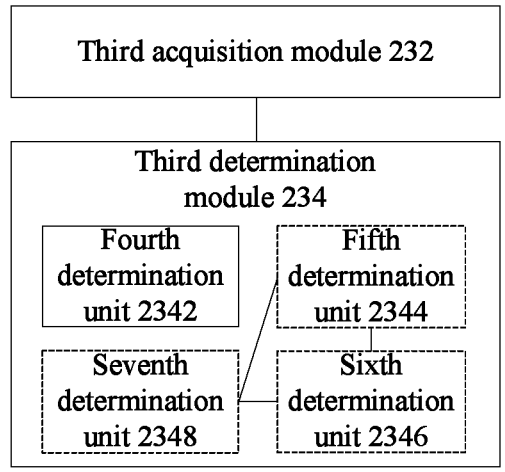
FIG. 24 is a structure block diagram of a third determination module in another media processing apparatus for adaptive streaming according to an embodiment of the disclosure.

FIG. 24 is a structure block diagram of a third determination module 234 in another media processing apparatus for adaptive streaming according to an embodiment of the disclosure. As shown in FIG. 24, the third determination module 234 may include a fourth determination unit 2342, and the third determination module 234 will be illustrated hereinbelow.

The fourth determination unit 2342 may be configured to determine a value of the message_data field in the MP timeline alignment event message as the location of the external media resource.

In an exemplary embodiment, as shown in FIG. 24, the third determination module may further include: a fifth determination unit 2344.

The fifth determination unit 2344 may be configured to determine the EMPT of the external media resource mapped to the MP timeline according to the EPT in the media segment and a value of the presentation_time_delta field in the MP timeline alignment event message.

In an exemplary embodiment, as shown in FIG. 24, the third determination module 23 may further include: a sixth determination unit 2346.

The sixth determination unit 2346 may be coupled to the fifth determination unit 2344, and configured to, if the presentation_time_delta field in the MP timeline alignment event message is set to 0, determine the Media Presentation time of the media segment to be aligned to an external timeline. The EMPT of the external media resource may be equal to the EPT in the media segment.

In an exemplary embodiment, as shown in FIG. 24, the third determination module may further include: a seventh determination unit 2348.

The seventh determination unit 2348 may be coupled to the fifth determination unit 2344 and/or the sixth determination unit 2346, and configured to determine that MP timeline alignment event messages shall have a same message identifier (id) field value for the same external media resource in the MP timeline alignment event, and the MP timeline alignment event messages shall document the following:

$$EMPT^{id} = ept_i^{id} + emsg_i^{id}.presentation\_time\_delta/emsg_i^{id}.timescale,$$

where $EMPT^{id}$ is the EMPT of the external media resource in the MP timeline alignment event on the MP timeline after a mapping between the MP timeline and an external timeline has been established;

$ept_i^{id}$ is an EPT of an $i^{th}$ media segment in the MP timeline alignment event;

$emsg_i^{id}.presentation\_time\_delta$ is a value of the presentation time delta filed in an $i^{th}$ MP timeline alignment event message;

$emsg_i^{id}.timescale$ is a value of a timescale field in an $i^{th}$ MP timelines alignment event message; and i is a positive integer.

Figure 25:
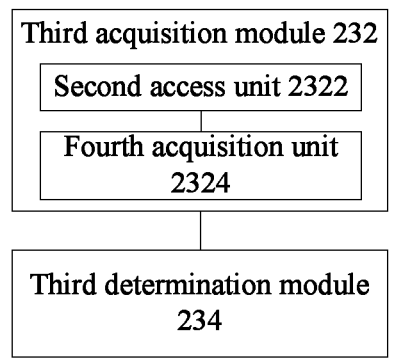
FIG. 25 is a structure block diagram of a third acquisition module in another media processing apparatus for adaptive streaming according to an embodiment of the disclosure.

FIG. 25 is a structure block diagram of a third acquisition module 232 in another media processing apparatus for adaptive streaming according to an embodiment of the disclosure. As shown in FIG. 25, the third acquisition module 232 may include a second access unit 2322 and a fourth acquisition unit 2324, and the third acquisition module 232 will be illustrated hereinbelow.

The second access unit 2322 may be configured to access an inband event stream (InbandEventStream) element in an MPD.

A value of a SchemeIdUri attribute of the InbandEventStream element may be equal to a value of a scheme_id_uri field in the MP timeline alignment event message, and a value attribute value of the InbandEventStream element may be equal to a value of a value field in the MP timeline alignment event message.

The fourth acquisition unit 2324 may be coupled to the second access unit 2322, and may be configured to acquire the MP timeline alignment event message carried in the media segment corresponding to the InbandEventStream element.

In an exemplary embodiment, the external timeline may include a TS timeline.

A person skilled in the art shall understand that all of the abovementioned modules or acts in the disclosure may be implemented by using a general calculation apparatus, may be centralized on a single calculation apparatus or may be distributed on a network composed of a plurality of calculation apparatuses. Alternatively, they may be implemented by using executable program codes of the calculation apparatuses. Thus, they may be stored in a storage apparatus and executed by the calculation apparatuses, the shown or described acts may be executed in a sequence different from this sequence under certain conditions, or they are manufactured into each integrated circuit module respectively, or multiple modules or acts therein are manufactured into a single integrated circuit module. Thus, the disclosure is not limited to a combination of any specific hardware and software.

The above is only the exemplary embodiments of the disclosure, and not intended to limit the disclosure. As will occur to a person skilled in the art, the disclosure is susceptible to various modifications and changes. Any modifications, equivalent replacements, improvements and the like made within the principle of the disclosure shall fall within the scope of protection defined by the appended claims of the disclosure.

INDUSTRIAL APPLICABILITY

As above, the media processing method and apparatus for adaptive streaming provided in some embodiments of the disclosure have the following beneficial effects. A problem caused by employing a single reference clock may be solved, thereby achieving media synchronization playing under a hybrid delivery mode of a broadcast network and a broadband network.

What is claimed is:

1. A media processing method for adaptive streaming, the method comprising:
    acquiring a Media Presentation (MP) timeline alignment event message carried in a media segment, wherein the MP timeline alignment event message comprises a presentation time delta (presentation_time_delta) field, configured to provide time for the MP timeline alignment event;
    determining an aligned media segment according to the MP timeline alignment event message, wherein the aligned media segment is a media segment of which a Media Presentation Time (MPT) in an MP timeline is aligned to an external timeline, and determining the aligned media segment according to the MP timeline alignment event message comprises: if a value of the presentation_time_delta field in the MP timeline alignment event message is set to a predetermined value, determining the media segment to be aligned to the external timeline; and
    calculating one or more MPTs of one or more media segments in an MP timeline alignment event after a mapping between the MP timeline and the external timeline has been established.

2. The method as claimed in claim 1, wherein acquiring the MP timeline alignment event message carried in the media segment comprises:

accessing an inband event stream (InbandEventStream) element in a Media Presentation Descriptor (MPD); and acquiring the MP timeline alignment event message carried in the media segment corresponding to the InbandEventStream element.

3. The method as claimed in claim 2, wherein the InbandEventStream element comprises:

an event stream scheme identifier (schemeIdUri) attribute and an event stream value attribute, configured to indicate the MP timeline alignment event.

4. The method as claimed in claim 1, wherein the MP timeline alignment event message further comprises at least one of:

an event duration (event_duration) field, configured to represent an MP remaining duration; and a message data (message_data) field, configured to provide a presentation time $T_P$ of the aligned media segment relative to a period start time (PeriodStart time).

5. The method as claimed in claim 4, wherein the MP timeline alignment event message further comprises:

a scheme message scheme identifier (scheme_id_uri) field and an event value field, wherein a value of the scheme_id_uri field is equal to a value of an event stream scheme identifier (schemeIdUri) attribute, and a value of the event value field is equal to a value of an event stream value attribute.

6. The method as claimed in claim 4, further comprising:

calculating the MPT of the aligned media segment based on the presentation time $T_P$ in the message_data field in the MP timeline alignment event message and a value of a presentation time offset $T_O$ attribute of a Representation where the aligned media segment is located, wherein the MPT of the aligned media segment is $T_M = T_P - T_O$.

7. The method as claimed in claim 1, wherein calculating the one or more MPTs of the one or more media segments comprises:

determining one or more media segments, having a same id field value, in the MP timeline alignment event message as the one or more media segments in the MP timeline alignment event; and calculating the one or more MPTs of the one or more media segments in the MP timeline alignment event according to a value of the presentation_time_delta field and a value of a timescale field within the MP timeline alignment event message.

8. The method as claimed in claim 1, wherein calculating the one or more MPTs of the one or more media segments in the MP timeline alignment event according to a value of the presentation_time_delta field in the MP timeline alignment event message and a value of a timescale field comprises:

calculating the one or more MPTs of the one or more media segments in the MP timeline alignment event according to a following formula:

$$MPT = MPT_0 + emsg.presentation\_time\_delta/emsg.timescale,$$

where $MPT_0$ and MPT separately represent the MPT of the aligned media segment in the MP timeline alignment event and MPT of a subsequent media segment in the MP timeline alignment event; and emsg.presentation_time_delta and emsg.timescale separately represent a value of the presentation_time_delta field and a timescale value within the MP timeline alignment event message.

9. The method as claimed in claim 1, wherein before acquiring the MP timeline alignment event message carried in the media segment, the method further comprises:

acquiring the media segment carrying the MP timeline alignment event message.

10. The method as claimed in claim 9, wherein acquiring the media segment carrying the MP timeline alignment event message comprises:

acquiring a scheme message scheme identifier (scheme_id_uri) field and an event value field;

determining an inband event stream (InbandEventStream) element in a Media Presentation Descriptor (MPD) by using a value of the scheme_id_uri field and a value of the event value field; and acquiring a media segment corresponding to the InbandEventStream element as the media segment.

11. A media processing apparatus for adaptive streaming, the apparatus comprising a hardware processor arranged to execute program modules comprising:

a first acquisition module, configured to acquire a Media Presentation (MP) timeline alignment event message carried in a media segment, wherein the MP timeline alignment event message comprises a presentation time delta (presentation_time_delta) field, configured to provide time for the MP timeline alignment event;

a determination module, configured to determine an aligned media segment according to the MP timeline alignment event message, wherein the aligned media segment is a media segment of which a Media Presentation Time (MPT) in an MP timeline is aligned to an external timeline, and the determination module is configured to determine, if a value of the presentation_time_delta field in the MP timeline alignment event message is set to a predetermined value, the media segment to be aligned to the external timeline; and a calculation module, configured to calculate one or more MPTs of one or more media segments in an MP timeline alignment event after a mapping between the MP timeline and the external timeline has been established.

12. A media processing method for adaptive streaming, the method comprising:

acquiring a Media Presentation (MP) timeline alignment event message carried in a media segment, wherein the MP timeline alignment event message comprises: a presentation time delta (presentation_time_delta) field, configured to provide a Media Presentation time delta, on the MP timeline, of the EMPT of the external media resource in an MP timeline alignment event relative to an Earliest Presentation Time (EPT) in the media segment; and determining, according to the MP timeline alignment event message, a location of an external media resource and an External Media Presentation Time (EMPT) of the external media resource mapped to an MP timeline, wherein determining, according to the MP timeline alignment event message, the EMPT of the external media resource mapped to the MP timeline further comprises:

determining the EMPT of the external media resource mapped to the MP timeline according to the EPT in the media segment and a value of the presentation_time_delta field in the MP timeline alignment event message;

or, if the presentation_time_delta field in the MP timeline alignment event message is set to 0, determining the Media Presentation time of the media segment to be aligned to an external timeline, wherein the EMPT of the external media resource is equal to an EPT in the media segment.

13. The method as claimed in claim 12, wherein the MP timeline alignment event message further comprises:

a message data (message_data) field, configured to provide a Uniform Resource Locator (URL) of the external media resource in an MP timeline alignment event.

14. The method as claimed in claim 13, wherein the MP timeline alignment event message further comprises:

an event message scheme identifier (scheme_id_uri) field, configured to provide an event message scheme identifier; and an event value field, configured to provide an event value.

15. The method as claimed in claim 13, wherein determining, according to the MP timeline alignment event message, the location of the external media resource comprises:

determining a value of the message_data field in the MP timeline alignment event message as the location of the external media resource.

16. The method as claimed in claim 12, wherein determining, according to the MP timeline alignment event message, the EMPT of the external media resource mapped to the MP timeline further comprises:

MP timeline alignment event messages have a same message identifier (id) field value for the same external media resource in the MP timeline alignment event, and the MP timeline alignment event messages document the following:

$$EMPT^{id} = ept_i^{id} + emsg_i^{id}.presentation\_time\_delta/emsg_i^{id}.timescale,$$

where $EMPT^{id}$ is the EMPT of the external media resource in the MP timeline alignment event on the MP timeline after a mapping between the MP timeline and an external timeline has been established;

$ept_i^{id}$ is an EPT of an $i^{th}$ media segment in the MP timeline alignment event;

$emsg_i^{id}.presentation\_time\_delta$ is a value of the presentation time delta field within an $i^{th}$ MP timeline alignment event message;

$emsg_i^{id}.timescale$ is a value of a timescale field within an $i^{th}$ MP timeline alignment event message; and i is a positive integer.

17. The method as claimed in claim 12, wherein acquiring the MP timeline alignment event message carried in the media segment further comprises:

accessing an inband event stream (InbandEventStream) element in a Media Presentation Descriptor (MPD), wherein a value of a schemeIdUri attribute of the InbandEventStream element is equal to a value of a scheme_id_uri field in the MP timeline alignment event message, and a value of an event stream value attribute of the InbandEventStream element is equal to a value of an event value field in the MP timeline alignment event message; and acquiring the MP timeline alignment event message carried in the media segment corresponding to the InbandEventStream element.

18. A media processing apparatus for adaptive streaming, comprising a hardware processor arranged to execute program modules comprising:

a third acquisition module, configured to acquire a Media Presentation (MP) timeline alignment event message carried in a media segment, wherein the MP timeline alignment event message comprises: a presentation time delta (presentation_time_delta) field, configured to provide a Media Presentation time delta, on the MP timeline, of the EMPT of the external media resource in an MP timeline alignment event relative to an Earliest Presentation Time (EPT) in the media segment; and a third determination module, configured to determine, according to the MP timeline alignment event message, a location of an external media resource and an External Media Presentation Time (EMPT) of the external media resource mapped to an MP timeline, wherein the third determination module is configured to:

determine the EMPT of the external media resource mapped to the MP timeline according to the EPT in the media segment and a value of the presentation_time_delta field in the MP timeline alignment event message;

or, determine, if the presentation_time_delta field in the MP timeline alignment event message is set to 0, the Media Presentation time of the media segment to be aligned to an external timeline, wherein the EMPT of the external media resource is equal to an EPT in the media segment.

* * * * *